(12) United States Patent
Haynes, III

(10) Patent No.: US 12,536,484 B2
(45) Date of Patent: Jan. 27, 2026

(54) SYSTEMS AND METHODS FOR JOB SEGMENTATION AND CORRESPONDING NEED IDENTIFICATION

(71) Applicant: thrv, LLC, Tiburon, CA (US)

(72) Inventor: James M Haynes, III, Tiburon, CA (US)

(73) Assignee: THRV, LLC, Tiburon, CA (US)

( * ) Notice: Subject to any disclaimer, the term of this patent is extended or adjusted under 35 U.S.C. 154(b) by 102 days.

(21) Appl. No.: 18/338,610

(22) Filed: Jun. 21, 2023

(65) Prior Publication Data

US 2023/0410003 A1     Dec. 21, 2023

Related U.S. Application Data

(63) Continuation-in-part of application No. 17/219,629, filed on Mar. 31, 2021, now Pat. No. 11,720,967.

(60) Provisional application No. 63/003,008, filed on Mar. 31, 2020.

(51) Int. Cl.
    *G06Q 10/0631*      (2023.01)
    *G06F 40/40*      (2020.01)
    *G06Q 10/0635*      (2023.01)

(52) U.S. Cl.
    CPC ..... *G06Q 10/063118* (2013.01); *G06F 40/40* (2020.01); *G06Q 10/0635* (2013.01)

(58) Field of Classification Search
    CPC ........ G06Q 10/063118; G06Q 10/0635; G06F 40/40
See application file for complete search history.

(56) References Cited

U.S. PATENT DOCUMENTS

| | | | | |
|---|---|---|---|---|
| 5,572,430 | A | * | 11/1996 | Akasaka ................. G06F 30/00 700/95 |
| 7,020,618 | B1 | * | 3/2006 | Ward ............... G06Q 10/06311 705/2 |
| 7,707,057 | B2 | * | 4/2010 | Ward ............... G06Q 10/06316 705/7.29 |

(Continued)

FOREIGN PATENT DOCUMENTS

CN      104268411 A     *     1/2015

OTHER PUBLICATIONS

Tan et al. "User Modeling in the Era of Large Language Models: Current Research and Future Directions" (Dec. 2023) (https://arxiv.org/pdf/2312.11518) (Year: 2023).*

(Continued)

*Primary Examiner* — Sujay Koneru

(57) ABSTRACT

Systems and methods for job segmentation and identification of unmet needs are provided. An example method includes receiving, from a user, identification of a job to be performed. The method also includes obtaining a set of job steps corresponding to segmentation of the job to be performed and obtaining a set of product features for a product designed to assist with completion of the job to be performed. The method further includes assigning each product feature of the set of product features to a corresponding job step of the set of job steps, assigning respective effort scores to the set of job steps, assigning respective measures of importance to the set of product features based on the respective effort scores, and causing the set of product features to be presented to the user with the respective measures of importance.

18 Claims, 28 Drawing Sheets

(56) References Cited

U.S. PATENT DOCUMENTS

| | | | | |
|---|---|---|---|---|
| 7,809,360 | B2* | 10/2010 | Agrawal | G06Q 10/109 455/446 |
| 8,510,199 | B1 | 8/2013 | Erlanger | |
| 2003/0225470 | A1* | 12/2003 | Demetriou | G06Q 10/06 700/100 |
| 2005/0022147 | A1* | 1/2005 | Sato | G06F 30/30 700/121 |
| 2005/0049961 | A1 | 3/2005 | Porter et al. | |
| 2006/0190111 | A1* | 8/2006 | Beniz | G06F 30/00 706/919 |
| 2008/0295100 | A1* | 11/2008 | Ainsworth | G06Q 10/06 718/102 |
| 2009/0054091 | A1* | 2/2009 | van Wijk | H04L 67/54 455/466 |
| 2010/0153183 | A1* | 6/2010 | Ulwick | G06Q 10/0631 705/348 |
| 2013/0090963 | A1* | 4/2013 | Sharma | G06Q 10/063112 705/7.13 |
| 2013/0152092 | A1* | 6/2013 | Yadgar | G10L 15/1822 718/102 |
| 2015/0066772 | A1 | 3/2015 | Griffin et al. | |
| 2015/0120650 | A1* | 4/2015 | Seay | G06F 16/951 707/610 |
| 2016/0275585 | A1* | 9/2016 | Scoggins | G06Q 30/0621 |
| 2017/0069005 | A1* | 3/2017 | Kirkman | G06Q 30/0611 |
| 2017/0316523 | A1* | 11/2017 | Jafri | G06Q 50/14 |
| 2018/0005246 | A1* | 1/2018 | Basam | G06F 11/0709 |
| 2018/0107797 | A1* | 4/2018 | Schuck | G16H 40/20 |
| 2018/0285750 | A1* | 10/2018 | Purushothaman | H04L 41/149 |
| 2019/0139166 | A1* | 5/2019 | Walker | G06Q 30/0207 |
| 2019/0310635 | A1* | 10/2019 | Hazard | G06N 20/00 |
| 2020/0104774 | A1* | 4/2020 | Sun | G06Q 10/06393 |
| 2020/0110612 | A1* | 4/2020 | Ramchandran | G06F 11/3051 |
| 2020/0258013 | A1* | 8/2020 | Monnett | H04L 41/5074 |
| 2021/0056493 | A1* | 2/2021 | Fournier | G06Q 10/063118 |
| 2021/0328888 | A1* | 10/2021 | Rath | H04L 41/5074 |
| 2022/0187847 | A1* | 6/2022 | Cella | G06Q 10/06 |
| 2022/0214915 | A1* | 7/2022 | Takita | G06Q 10/06311 |
| 2022/0374645 | A1* | 11/2022 | Santoro | G06V 20/20 |

OTHER PUBLICATIONS

Brunner et al., 2019, "Sproof: A Platform for Issuing and Verifying Documents in a Public Blockchain," ICISSP, p. 15.

Hu et al., 2018, "Blockchain-based Smart Contracts-applications and Challenges," arXiv preprint arXiv:1810.04699.

Mughal et al., 2018, "Data Mining: Web Data Mining Techniques, Tools and Algorithms: An Overview," Information Retrieval, 9(6), print.

Timonin et al., 2016, "The Process of Personal Identification and Data Gathering Based on Big Data Technologies for Social Profiles," International Conference on Digital Transformation and Global Society, 576.

* cited by examiner

400

(402) A method for determining a product investment decision and risk assessment.

(404) Obtaining, in electronic form, a plurality of data elements associated with a candidate subject. The plurality of data elements comprises a first set of data elements provided by a first user and a second set of data derived from a plurality of information sources.

(406) Forming, based on a subset of the plurality of data elements, a taxonomy of data using a plurality of classification models. The subset of the plurality of data elements comprises less than all of the plurality of data elements and comprises at least one data element from the first set of data and at least one data element from the second set of data. The taxonomy of data comprises a plurality of categories determined by the plurality of classification models. At least one category in the plurality of categories comprises a corresponding plurality of input variables in a plurality of variables associated with a variation in the at least one category.

(408) Determining, based on the forming, a respective output from a range of outputs in accordance with a selection of a set of variables comprising a first set of input variables from the corresponding plurality of variables for the at least one category and a second set of control variables associated with the candidate subject.

(410) Evaluating the respective output against a plurality of threshold criteria. The plurality of threshold criteria comprises a first threshold criterion associated with the candidate subject and a second threshold criterion associated with a plurality of statistical models.

(412) Determining if the respective output satisfies each threshold criterion in the plurality of threshold criteria.

(414) Providing, in electronic form, based on the determining if the respective output satisfies each threshold criterion, a product investment decision and risk assessment for the candidate subject in accordance with the satisfaction of each threshold criterion in the plurality of threshold criteria if the respective output satisfies each threshold criterion in the plurality of threshold criteria.

FIG. 4

500-2 thrv 1 thrv OnTime demo Ontime

+ New Feature Thesis | User 1

- Development
  - Road Map
- Strategy
  - Jobs-to-be-done
- Research
  - Qualitative ☐ Sync and Optimize Stops

Approval: Draft | In Review | Approved
Status: Pending | In Progress | Completed Let User 1 know if you agree with building this feature idea. Otherwise, click Needs Work and leave a coment with your feedback.

New Feature Idea
How we will help out customers satisfy the need faster and more accurately

Customer's Goal
What our customers struggle to accomplish.
Job: Get stop a destination on time
Job Step: Plan the stops
Need: Determine the optimal sequence to make planned stops.

Sync and Optimize Stops
To use this feature, a user will:
1. Sync their calendar with the app.
2. Click optimize.
The algorithm will reorder their day to ensure each stop is reached.

Our Customer's Value
How this feature will help our customers satisfy the need with less effort

|  | Speed | Accuracy | Effort |
|---|---|---|---|
| Competitor | 5 seconds | 33% | 93 |
| Baseline | | | |
| New Feature: | 1 second | 90 | 17 |
| | 28-1 | 28-2 | 28-3 |

[ Needs work ]  [ Agree ]

Agreement Status 0/2 users have agreed

| User 2 | Needs Work |
| User 1 | Needs Work |

Invite other colleagues to review and give feedback  [ Send ]

Comments

User 2: I just wanted to see how the needs work button worked.
User 1: This is a great feature.

Ask and answer questions about how this feature satisfies customer needs  [ Comment ]

FIG. 5B thrv 1 thrv OnTime demo Ontime _____ + New Feature Thesis | User 1

500-3

○ Development
    Road Map

※ Strategy
    Qualitative

Job: Get to a destination on time »

Jobs-to-be-done

※ Research
    Qualitative

Job Steps   ○ Job ○ Need
Add at least 6 job steps that are required to get this job done. You   Step  CES
can add customer needs within each job step.   CES  + Job Step 1 ˅ Estimate the departure time under normal travel conditions 1.1 Determine the address of the destination 1.2 Select the arrival time 1.3 Determine how long it will take to reach destination under normal travel conditions 1.4 Determine how long it will take to find parking upon arrival under normal conditions 1.5 Determine time zone differences when selecting the arrival time 1.6 Determine if the destination can be reached on time under normal travel conditions + Need 2 ˅ Determine how much time to allow for vehicle preparation 2.1 Determine how much time is needed to walk to the vehicle 2.2 Determine how much time is needed to clean off the vehicle before the trip 2.3 Determine how much time is needed to set the vehicle's interior temperature 2.4 Determine how much time is needed to perform basic maintenance activities required for the trip 2.5 Determine how much time is needed to unload items from the vehicle to make needed space available 2.6 Determine how much time is needed to load items required for the trip into the vehicle + Need 3 ˅ Determine how much time to allow for atypical travel conditions 3.1 Determine how much time is needed to deal with adverse weather conditions 3.2 Determine how much time is needed to deal with adverse traffic conditions 3.3 Determine how much time is needed to deal with adverse parking conditions + Need

FIG. 5C

500-5 thrv 1 thrv OnTime demo Ontime                                              + New Feature Thesis    User 1

- Development
  - Road Map

|      | Need | Competition | Feature | Value | Approval |
  |------|------|-------------|---------|-------|----------|

- Strategy
  - Jobs-to-be-done

Select a job and a job step.

In the drop down choose the specific job and job step you will focus on in your feature thesis. If you need to add or to edit your Job Data, please go to the Qualitative Page

| Get to a destination on time | ⌄ |
  |---|---|

| Plan the stops | ⌄ |
  |---|---|

- Research
  - Qualitative

[ Next ]

FIG. 5E thrv 1 thrv OnTime demo OnTime      + New Feature Thesis     User 1

500-8

- Development
  - Road Map
- Strategy
  - Jobs-to-be-done
- Research
  - Qualitative Need     Competition     Feature     Value     Approval

Customer Effort Score.

What percent of customers do you think would perceive the current speed and accuracy to be "fast and accurate" vs "slow and inaccurate?" In other words, what percentage of customers would say that it's difficult to satisfy the need?

Customer Effort

[ 85 ]
28-1

[ Back ]     [ Next ]

FIG. 5H thrv 1 thrv OnTime demo Ontime 500-10 +New Feature Thesis User 1

- Development
  Road Map
- Strategy
  Jobs-to-be-done
- Research
  Qualitative Need — Competition — Feature — Value — Approval

Sync and Optimize – Speed & Accuracy
Estimate the time it will take customers to satisfy the need using your new feature and how accurate the result will be.

Feature speed: 1 sec. — 28-1

Feature accuracy: 98 % — 28-2

[Back] [Next]

FIG. 5J thrv 1 thrv OnTime demo OnTime    500-12

+ New Feature Thesis    User 1

- Development
  - Road Map

| Need | Competition | Feature | Value | Approval |

- Strategy
  - Jobs-to-be-done

Sync and Optimize – Customer Effort Score

The customer effort score is the difference between the customer effort score of your new feature and the customer effort score of the existing solutions. A high customer effort score is better.

Customer Effort: 60 ——◆—— 28-1

Business Goal

This step is optional. Here you can reference specific OKRs or business metrics that you might be targeting with your new feature idea.

Acquire new uses faster and retain users

- Research
  - Qualitative

Satisfying the unmet need.

[Back]    [Skip]  [Next]

FIG. 5L

500-13 thrv  1 thrv OnTime demo OnTime                                   + New Feature Thesis     User 1

- Development
  - Road Map           Need          Competition          Feature          Value          Approval
- Strategy
  - Jobs-to-be-done

Sync and Optimize -- Get Your Team Onboard

Your feature thesis is complete. Share it with your colleagues to align with them on how to prioritize this idea. Here's what the email will look like.

- Research
  - Qualitative

Email subject: [name] has a new feature idea!
  Email text

Hi,

User 1 has worked on a new feature idea in the thrv app to satisfy one of your customer's unmet needs and wants your thoughts on the feature thesis.

To check it out, click on the link to sign in to thrv or create an account.

Click to view User 1 Feature Thesis

Thanks!

Preview Feature Thesis Summary

Enter email addresses here:

hello@example.com, hi@example.com

Separate email addresses by comma

[ Back ]                                              [ Skip ]    [ Next ]

There are no invited users

FIG. 5M

600-1 thrv  1 thrv OnTime  DemoView                               | Get JTBD Help |   User 1

Roadmap  Product Roadmap

Watch the video introduction                | Add a Release | | New Feature Thesis |

Strategy

Research   | All Features | | My Features | | Features to Review | | Completed Releases |                | View All |

Course

1 › First Release              Needs 1    Tasks 0/2   Agree 1/2    Sep 1, 2020

Feature Name        Step Priority   Speed      Accuracy  Tasks  Agree  Approval  Status
              1.1 › Sync and Optimize Stops    High   Very Fast  High      0/2    1/2    Approved  In Progress 2 › Second Release             Needs 28-1 1   28-2    Tasks 0/0  Agree 0/0    Nov 1, 2020

Feature Name        Step Priority   Speed      Accuracy  Tasks  Agree  Approval  Status
              2.1 › Drive Time Estimation  High       -          -         0/0    0/0    Draft     Pending Backlog Feature Name        Step Priority   Speed      Accuracy  Tasks  Agree  Approval  Status
              1 › Delay Assessment    Medium          -          -         0/0    0/0    Draft     Pending

| | | | | |
|---|---|---|---|---|
| thrv 1 thrv OnTime DemoView | | | Get JTBD Help | User 1 |

| | Strategy | | | View > |
|---|---|---|---|---|
| Roadmap | | | | Frequency |
| Strategy | Customer: Drivers —26-1 | | Customers | 17 Million |
| Research | Job: Get to destination on time —26-2 | | 26-3— Market Size | $1.8 Billion |
| Course | Job Step | | Priority | CES |
| | 5 Plan the stops | | High | 86% |
| | 4 Determination how much time to allow for errands along the way | | High | 72% |
| | 1 Estimate the departure time under normal travel conditions | | High | 79% |
| | 16 Walk to the destination | | Medium | 27% |
| | 15 Reset the route as needed | | Medium | 76% |
| | 14 Park the vehicle | | Medium | 67% |
| | 13 Assess if you are still on time | | Medium | 81% |
| | 12 Make planned stops along the way | | Medium | 37% |
| | 11 Drive to the destination | | Medium | 37% |
| | 3 Determine how much time to allow for atypical travel conditions | | Medium | 56% |
| | 10 Prepare the vehicle for the drive | | Low | 18% |
| | 9 Walk to the vehicle | | Low | 16% |
| | 8 Decide whether or not to make the drive | | Low | 25% |
| | 7 Set the departure time | | Low | 15% |

600-3 thrv 1 thrv OnTime DemoView

Get JTBD  User 1
Help
Approved | In Progress

Roadmap  1.1 Sync and Optimize Stops

Strategy

Research

Course

Customer Problem — 26-1

*Drivers* are trying to *Get to a destination on time*, but they struggle to *Plan the stops* because they need to *Determine the optimal sequence* to make planned stops faster and more accurately.

Our Customer Value | Qualitative | Quantitative 26-2

| | Speed | Accuracy |
| Our Feature | Very Fast | High |
| Competitor | Very Slow | Very Low |

28-1    28-2

Competitor Solution — 26-4
Google Add A Stop

With Google Add A Stop, a user can add multiple stops along a route.
The user inputs destinations one at a time.
The user can manually re-order the stops.

Messages

New Feature Idea

To satisfy this need faster and more accurately, our feature will enable a user to:
1. Sync their calendar with the OnTime app.
2. Clock optimize to optimize the stops in the optimal sequence. The algorithm will reorder their day to ensure each stop is reached on time.
Edit Images O1...png  O2...png  O3...png  O4...png
397...KB  396...KB  273...KB  271...KB Needs work | Agree

Our Business Goal

Acquire new users faster and retain users.

Target the segment of underserved customers who struggle the most to plan their stops. These users make frequent and unfamiliar stops.

Tasks

+ Create Task

600-4

Agreement Status

| Name | Status |
|---|---|
| User 2 | Needs Work |
| User 1 | Agree |

User 1

We can get the engineering team to evaluate the different optimization algorithms.

July 23rd 2020 03:48 pm

User 2

We need to look into the feasibility of creating a highly accurate optimization algorithm and set up appropriate tests for determining if the algorithm is accurate.

Comment

[ Comment ]

Invite People    Invite all company members

[ Send ]

Enter email addresses here separated by commas

FIG. 6D thrv — Jobs-to-be-Done Course

Roadmap
Strategy
Research
<u>Course</u>

Get JTBD Help    User 1 ⌄

600-5

| Course Summary | Introduction thrv | Customers 26-1 | Markets 26-2 | Market Size 26-3 | Needs 26-4 |
| --- | --- | --- | --- | --- | --- |
| | Ideas 26-6 | Strategy 26-7 | Competitors 26-8 | Segmentation 26-9 | Value 26-10 |
| | Messaging 26-12 | Design 26-13 | Sales 26-14 | Equity 26-15 | |
| | Unmet Needs 26-5 | Positioning 26-11 | | | All lessons Completed |

(802) Receive, from a user, identification of a job to be performed

(804) Obtain a set of job steps corresponding to segmentation of the job to be performed

(806) Obtain a set of product features for a product designed to assist with completion of the job to be performed

(808) Assign each product feature of the set of product features to a corresponding job step of the set of job steps

(810) Assign respective effort scores to the set of job steps

(812) Assign respective measures of importance to the set of product features based on the respective effort scores

(814) Cause the set of product features to be presented to the user with the respective measures of importance

FIG. 8

SYSTEMS AND METHODS FOR JOB SEGMENTATION AND CORRESPONDING NEED IDENTIFICATION

PRIORITY AND RELATED APPLICATIONS

The present application is a continuation-in-part of U.S. patent application Ser. No. 17/219,629, entitled "Systems and Methods for Determining Product Roadmap Investment Decisions and Risk Assessment," filed Mar. 31, 2021, which claims priority to U.S. Provisional Patent Application No. 63/003,008, entitled "Systems and Methods for Determining Product Roadmap Investment Decisions and Risk Assessment," filed Mar. 31, 2020, each of which is hereby incorporated by reference in its entirety.

TECHNICAL FIELD

The present disclosure relates to systems and methods for identifying and segmenting jobs and corresponding needs, including but not limited to data classification and forming data taxonomies for the identification and segmentation.

BACKGROUND

Making product feature and roadmap decisions and assessing the risk of those decisions is exceptionally difficult. This difficulty is a reason why a vast majority of new products fail. At times, product failures can lead directly to the failure of an entire company. For example, BlackBerry, Britannica, and Kodak are just three examples of companies that each made substantial investments in their product roadmaps that led directly to their respective failures as markets and technologies changed rapidly. See Palacios Fenech et al., 2016, "The Dive and Disruption of Successful Current Products: Measures, Global Patterns, and Predictive Model," Journal of Product Innovation Management, 33(1), pg. 53.

The reasons product roadmap investment decisions and risk assessment are so difficult is because the volume of information, the type of information, and the complexity of the decisions to be made are beyond the ability of any human or team of humans. This information and the need to make these decisions changes rapidly, often in real-time, in a world of globally connected markets and competition.

The required information to make product roadmap investment decisions and risk assessment comes from an enormous and growing range of sources, including online pages, online and offline documents, audio, video, customer behaviors, searches, customer purchases, customer calls, product usage, usability testing and tracking, customer feedback, support tickets, and technology-triggered events within a product. This information is in both unstructured and structured forms, providing added complexity in parsing the information.

Gathering, organizing, and structuring this information in real-time in order to analyze the information, calculate product roadmap risk, and determine product roadmap investment decisions is extremely complex. Given the difficulties of gathering, organizing, and structuring the required information and the difficulty of making accurate and timely decisions in real-time with the information, most people and companies resort to manual processes and guesses that result in failed product roadmaps, as was the case with BlackBerry, Britannica, and Kodak.

Prior solutions to product roadmap investment decisions and risk assessment fail to deliver accurate and timely information, calculations, and decisions. For instance, prior solutions neither have in one database the information required to make product roadmap investment decisions and risk assessment, nor a systematic way of gathering, organizing, and structuring the relevant information in real-time. Moreover, these prior solutions do not have a systematic way of filtering information that is not relevant to the investment decision and the risk assessment. Additionally, prior solutions lack a systematic way of calculating precise investment analysis (e.g., revenue, costs, returns) and risk assessment (e.g., probability of success) in real-time with the required data. Further, these solutions do not have a systematic way of automatically structuring information to function as inputs into product roadmap and risk assessment decisions. Also, prior solutions do not have a systematic way of enabling users to evaluate the information, the investment decisions, and the risk assessment in real time.

The information disclosed in this Background section is only for enhancement of understanding of the general background of the invention and should not be taken as an acknowledgement or any form of suggestion that this information forms the prior art already known to a person skilled in the art.

SUMMARY

Advantageously, the systems and methods detailed in the present disclosure address the shortcomings detailed above. One aspect of the present disclosure includes systems and methods for identifying job steps and/or corresponding unmet needs. In some embodiments, the job steps and unmet needs are identified using a language model (e.g., a large language model) and/or other form of generative artificial intelligence. In some embodiments, the job steps and unmet needs are identified using a data taxonomy. In accordance with some embodiments, a method of job segmentation includes: (i) receiving, from a user, identification of a job to be performed; (ii) obtaining a set of job steps corresponding to segmentation of the job to be performed; (iii) obtaining a set of product features for a product designed to assist with completion of the job to be performed; (iv) assigning each product feature of the set of product features to a corresponding job step of the set of job steps; (v) assigning respective effort scores to the set of job steps; (vi) assigning respective measures of importance to the set of product features based on the respective effort scores; and (vii) causing the set of product features to be presented to the user with the respective measures of importance.

Another aspect of the present disclosure includes systems and methods for maintaining a taxonomy of data of stored data elements that are updated (e.g., in real-time) based on a plurality of data elements gathered from a plurality of information sources utilizing a plurality of data gathering mechanisms. In some embodiments, the plurality of data elements gathered by the systems and method of the present disclosure includes structured data, semi-structured data, and unstructured data. The systems and methods of the present disclosure overcomes difficulties in determining product roadmap decisions and risk assessment by gathering the plurality of data elements, classifying the plurality of data elements, and structuring the classified data elements into a taxonomy of data. Further, the systems and methods of the present disclosure allow for conducting evaluations on the taxonomy of data using a plurality of statistical models in concert with a selection of a plurality of variables from the classified data elements into a taxonomy of data in order to determine product roadmap investment decisions and risk assessment. In some embodiments, the selection of the plurality of variables is dynamically reconfigured in accordance with determining if each threshold criterion in a plurality of threshold criteria is satisfied. In some embodiments, the systems and methods of the present disclosure allow facilitate providing, in electronic form, the determination of the product roadmap investment decision and risk assessment, such as configuring a user interface to present the determination of the product roadmap investment decision and risk assessment.

In some embodiments, the gathering of the plurality of data elements is conducted using a plurality of data gathering mechanisms. In some embodiments, the plurality of data gathering mechanisms include one or more automated search and collection data gathering mechanisms, (e.g., a collection of web pages), one or more conversion of analog signals data gathering mechanisms (e.g., a voice call), one or more user input data gathering mechanisms (e.g., a defined customer need obtained from a user or a response to a survey data gathering mechanism). In some embodiments, the systems and methods of the present disclosure obtain the plurality of data elements and form the taxonomy of data in real-time. For example, as web pages change or as new information is published on the web, as new data element are converted from analog files, or as input by the user, the taxonomy of data is updated in real-time to reflect these new data elements. In some embodiments, the taxonomy of data is generated and/or updated using one or more language models.

Another aspect of the present disclosure includes systems and methods utilizing a plurality of classification models to organize and structure the plurality of data elements, and, optionally, form a subset of the plurality of data elements, and create the taxonomy of data to facilitate the product roadmap investment decisions and risk assessment.

An example method includes obtaining, in electronic form, a plurality of data elements associated with a candidate subject. The plurality of data elements includes a first set of data elements provided by a first user and a second set of data derived from a plurality of information sources. The method further includes forming, based on a subset of the plurality of data elements, a taxonomy of data using a plurality of classification models. The subset of the plurality of data elements includes less than all of the plurality of data elements. Moreover, the subset of the plurality of data elements includes at least one data element from the first set of data and at least one data element from the second set of data. Additionally, the taxonomy of data includes a plurality of classifications determined by the plurality of classification models. At least one classification in the plurality of classifications includes a corresponding plurality of input variables in a plurality of variables associated with a variation in the at least one classification. The method includes determining, based on the forming the taxonomy of data, a respective output from a range of outputs in accordance with a selection of a respective set of variables. The respective set of variables includes first set of input variables from the corresponding plurality of variables for the at least one classification and a second set of control variables associated with the candidate subject. Accordingly, the method includes evaluating the respective output against a plurality of threshold criteria. The plurality of threshold criteria includes a first threshold criterion associated with the candidate subject and a second threshold criterion associated with a plurality of statistical models. Moreover, the method includes determining if the respective output satisfies each threshold criterion in the plurality of threshold criteria. From this, the method includes providing, in electronic form, based on the determining if the respective output satisfies each threshold criterion, a product investment decision and risk assessment for the candidate subject in accordance with the satisfaction of each threshold criterion in the plurality of threshold criteria.

In some embodiments, the obtaining the plurality of data elements utilizes a plurality of data gathering mechanisms to obtain the plurality of data elements. The plurality of data gathering mechanisms includes one or more publication search mechanisms, one or more analog conversion mechanisms, one or more user interface mechanisms, one or more survey mechanism, or a combination thereof.

In some embodiments, the candidate subject is a defined market in a plurality of defined markets. Each market in the plurality of defined markets includes a corresponding plurality of customers.

In some embodiments, the plurality of information sources includes one or more publication sources and one or more private sources.

In some embodiments, the forming the taxonomy of data includes translating, via at least one classification model in the plurality of classification models, the plurality of data elements from a native format into a predetermined structured format.

In some embodiments, the subset of the plurality of data elements is determined by the plurality of classification models.

In some embodiments, each data element in the subset of data elements satisfies a threshold relevancy score determined by at least one classification model in the plurality of classification models.

In some embodiments the first set of input variables in the respective set of variables includes a first input variable of a respective description of customers, a second input variable of a respective description of beneficiaries, a third input variable of a respective description of executors, a fourth input variable of a respective description of purchase decision makers, a fifth input variable of a respective description of customer goals, a sixth input variable of a respective description of customer steps, or a seventh input variable of a respective description of customer needs, or a combination thereof.

In some embodiments, the second set of control variables in the respective set of variables includes a first control variable of a respective description of a speed, a second control variable of a respective description of an accuracy, a third control variable of a respective description of a level of effort, a fourth control variable of a respective description of a perception of effort, or a fifth control variable of a respective description of a perception of emotion, or a combination thereof.

In some embodiments, the plurality of statistical models includes a clustering model, a factoring model, a kurtosis model, a Pareto efficiency model, or an assessment of risk model, or a combination thereof.

In some embodiments, the respective set of variables includes a first variable defined by a user and a second variable defined without human intervention.

In some embodiments, the forming the taxonomy of data further includes storing the taxonomy of data.

In some embodiments, the respective output includes a willingness to pay, a customer segment, a customer value, an assessment of a risk, a financial investment, a probability of success, a revenue growth, a message resource, a return on investment, or a combination thereof.

In some embodiments, the plurality of threshold criteria includes a threshold variance in the selection of the respective set of variables.

In some embodiments, the determining the respective output, evaluating the respective output, and determining if the plurality of threshold criteria is satisfied are repeated at least 10 times before the respective output satisfies each threshold criterion in the plurality of threshold criteria based on the determining if the plurality of threshold is satisfied.

In some embodiments, at least the determining a respective output, the evaluating the respective output, and the determining if each threshold criterion is satisfied are repeated a plurality of times before the respective output satisfies each threshold criterion in the plurality of threshold criteria based on the determining if each threshold criterion is satisfied. In some embodiments, each repetition of the determining a respective output, the evaluating the respective output, and the determining if each threshold criterion is satisfied uses a different respective set of variables including a different respective first set of input variables from the corresponding plurality of variables for the at least one classification and a different respective second set of control variables associated with the candidate subject.

In accordance with some embodiments, a computing system is provided, such as a server system, a personal computer system, or other electronic device. The computing system includes control circuitry and memory storing one or more sets of instructions. The one or more sets of instructions including instructions for performing any of the methods described herein.

In accordance with some embodiments, a non-transitory computer-readable storage medium is provided. The non-transitory computer-readable storage medium stores one or more sets of instructions for execution by a computing system. The one or more sets of instructions including instructions for performing any of the methods described herein.

Thus, devices and systems are disclosed with methods for job segmentation, need identification, taxonomy maintenance, and data gathering. Such methods, devices, and systems may complement or replace conventional methods, devices, and systems.

The features and advantages described in the specification are not necessarily all-inclusive and, in particular, some additional features and advantages will be apparent to one of ordinary skill in the art in view of the drawings, specification, and claims provided in this disclosure. Moreover, it should be noted that the language used in the specification has been principally selected for readability and instructional purposes and has not necessarily been selected to delineate or circumscribe the subject matter described herein.

BRIEF DESCRIPTION OF THE DRAWINGS

So that the present disclosure can be understood in greater detail, a more particular description can be had by reference to the features of various embodiments, some of which are illustrated in the appended drawings. The appended drawings, however, merely illustrate pertinent features of the present disclosure and are therefore not necessarily to be considered limiting, for the description can admit to other effective features as the person of skill in this art will appreciate upon reading this disclosure.

FIG. 4 is a flow chart of processes and features of methods for determining product roadmap investment decisions and risk assessment in accordance with some embodiments.

FIGS. 5A, 5B, 5C, 5D, 5E, 5F, 5G, 5H, 5I, 5J, 5K, 5L, and 5M collectively illustrate example user interfaces for determining product roadmap investment decisions and risk assessment in accordance with some embodiments.

FIGS. 6A, 6B, 6C, 6D, and 6E collectively illustrate example user interfaces for determining product roadmap investment decisions and risk assessment in accordance with some embodiments.

FIGS. 7A, 7B, 7C, and 7D collectively illustrate example user interfaces for product, strategy, and research identification and survey generation in accordance with some embodiments.

FIG. 8 is a flow chart of processes and features of methods for job segmentation in accordance with some embodiments.

In accordance with common practice, the various features illustrated in the drawings are not necessarily drawn to scale, and like reference numerals can be used to denote like features throughout the specification and figures.

DETAILED DESCRIPTION

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, and components have not been described in detail so as not to unnecessarily obscure aspects of the embodiments.

Figure 1:
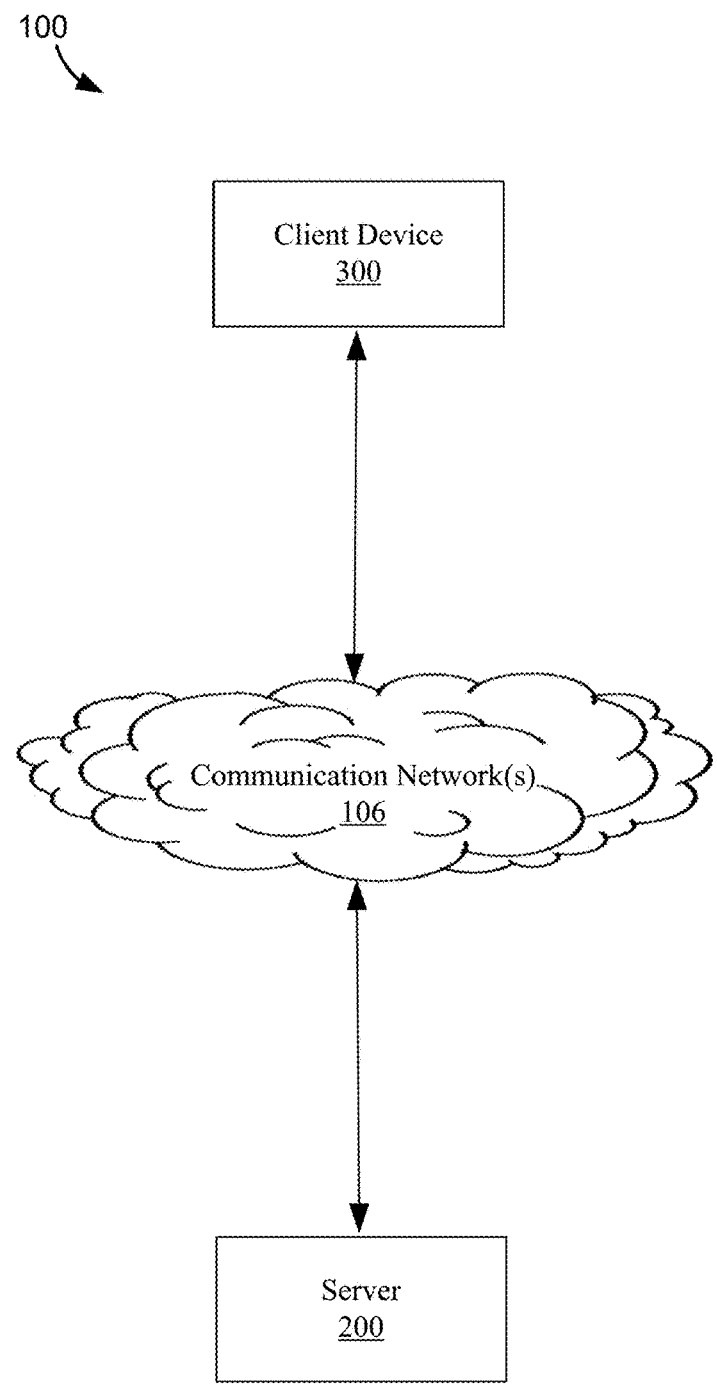
FIG. 1 illustrates an example product roadmap investment decision and risk assessment system topology including a server system and a client device in accordance with some embodiments.

FIG. 1 depicts a block diagram of a distributed client-server system 100 (e.g., a computing system) according to some embodiments of the present disclosure. In some embodiments, the system 100 facilitates determining a product roadmap investment decision and risk assessment for a population of client devices (e.g., client devices 300 of FIG. 3). The system 100 includes a server 200 and one or more client devices 300. In some embodiments, the server 200 facilitates providing of a product roadmap investment decision and risk assessment for the population of client devices 300. The server 200 communicates with one or more client devices 300 through a communications network 106, such as receiving a request from the one or more client devices 300 for a product roadmap investment decision and risk assessment of a candidate subject (e.g., a proposed new product or investment).

Of course, other topologies of the system 100 are possible. For instance, in some embodiments, any of the illustrated devices and systems constitute several computing systems that are linked together in a network, or are a virtual machine and/or container in a cloud computing environment. Moreover, the illustrated devices and systems may wirelessly transmit information between each other. As such, the example topology shown in FIG. 1 merely serves to describe the features of an embodiment of the present disclosure in a manner that will be readily understood to one of skill in the art. Additionally, in some embodiments, the server 200 and the client device 300 constitute a single computing system. However, the present disclosure is not limited thereto.

Figure 2A:
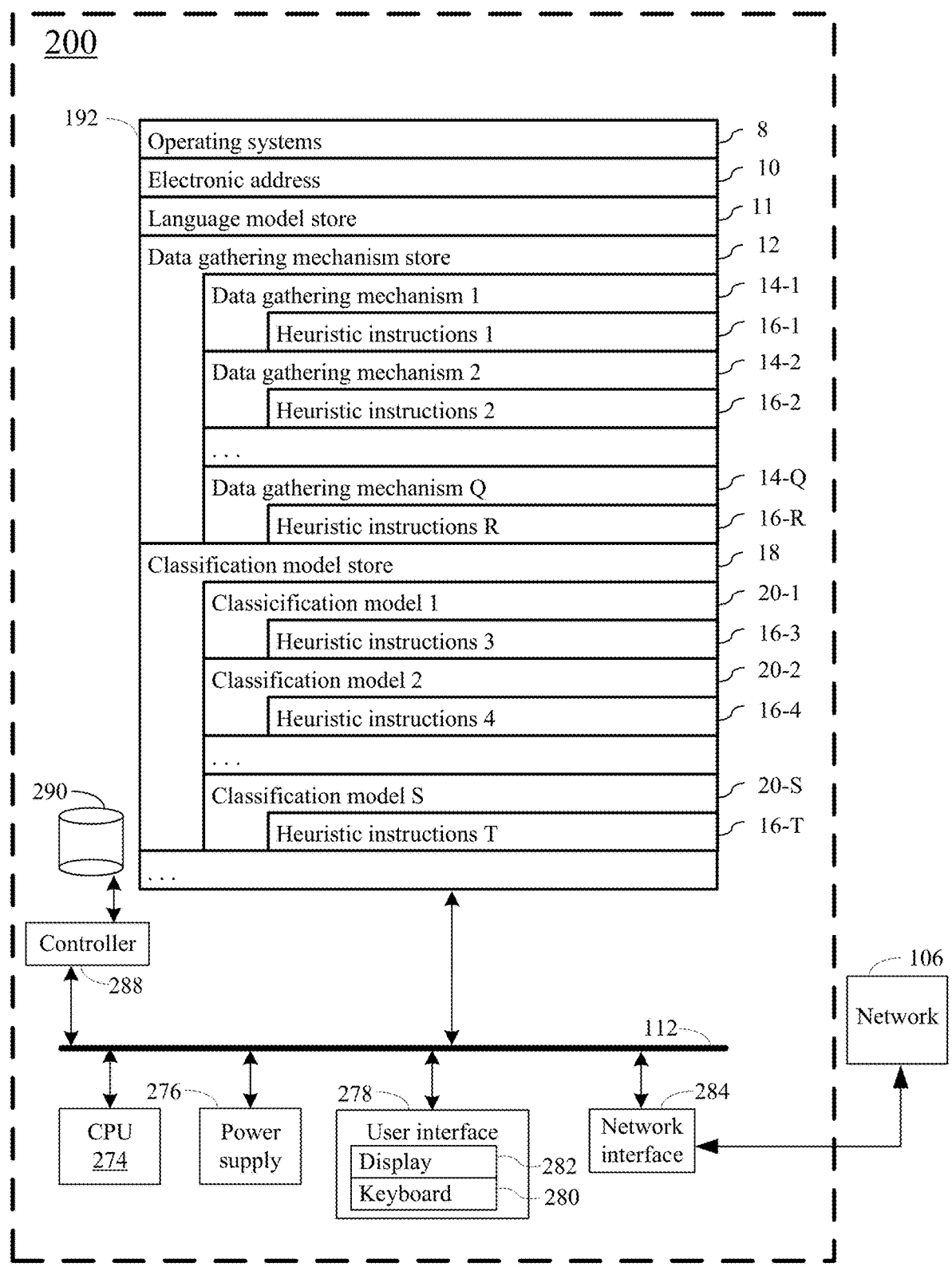
FIGS. 2A and 2B collectively illustrate various modules and/or components of a server system in accordance with some embodiments.
Figure 2B:
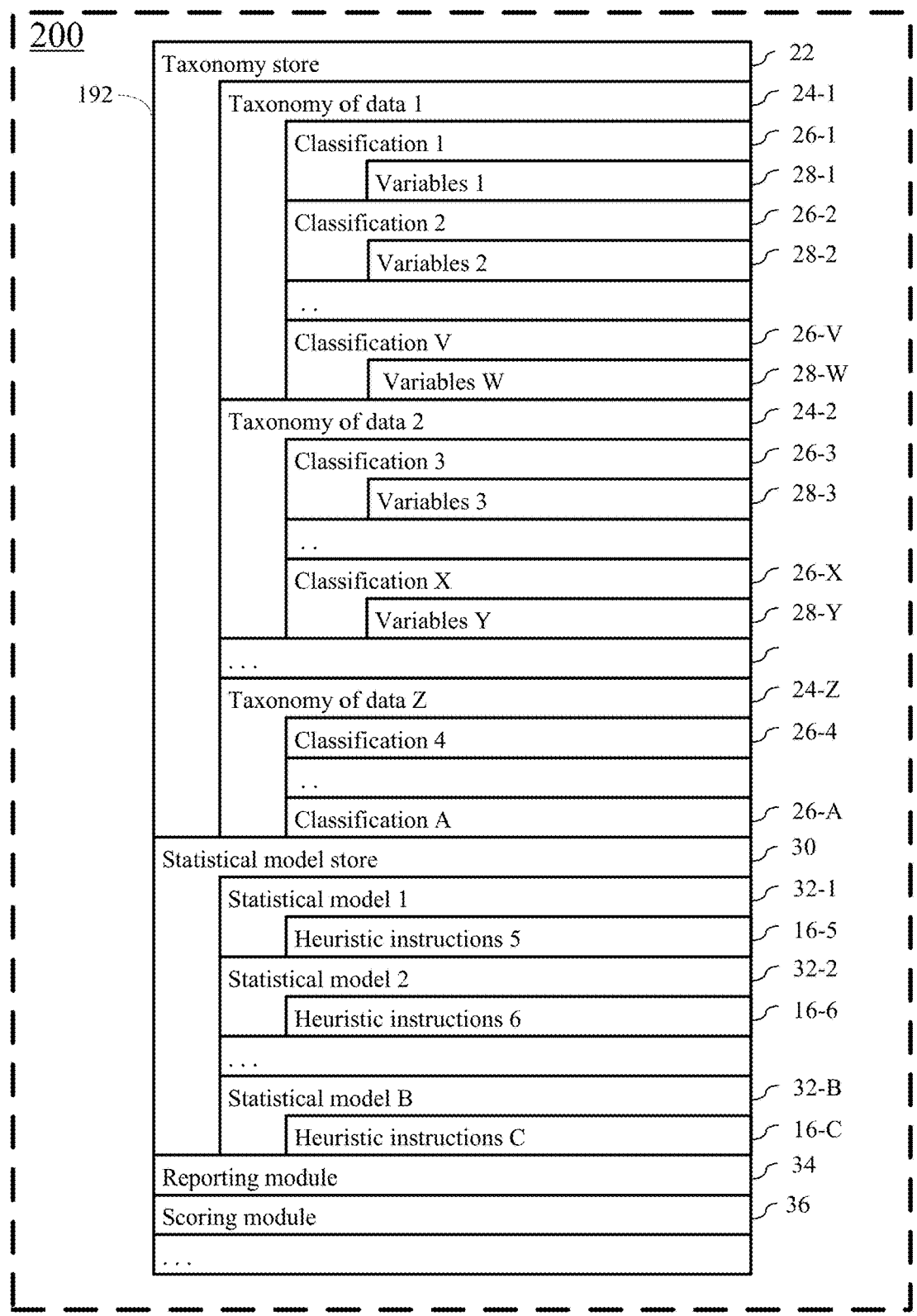
Figure 3:
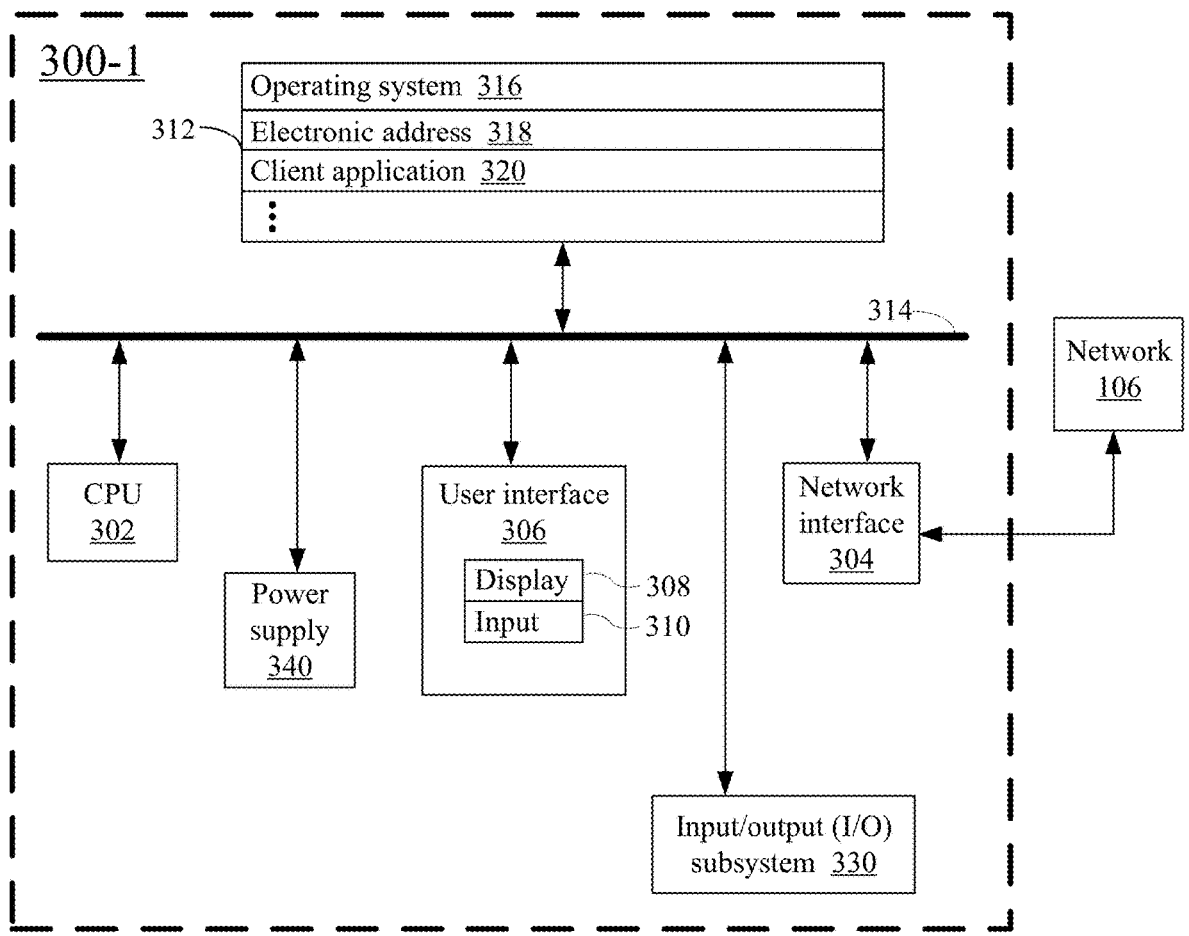
FIG. 3 illustrates various modules and/or components of a client device in accordance with some embodiments.

A detailed description of the system 100 is described in conjunction with FIG. 1 through FIG. 3. As such, FIG. 1 through FIG. 3 collectively illustrate an example topology of the system 100 in accordance with the present disclosure.

In accordance with some embodiments, the server 200 is configured to facilitate determining and providing a product roadmap investment decision and risk assessment of a candidate subject. Specifically, the server 200 may gather a plurality of data elements and form a taxonomy of data (e.g., taxonomy of data 24-1 of FIG. 2B) based on the plurality of data elements. In some embodiments, the server 200 includes a data gathering mechanism store (e.g., data gathering mechanism store 12 of FIG. 2A) that allows the server 200 to compile the plurality of data elements from one or more sources (e.g., client device 300, from a remote device such as a remote database over communications network 106, etc.) to utilize in determining and providing the product roadmap investment decision and risk assessment of the candidate subject.

In some embodiments, the server 200 obtains the data elements wirelessly through radio-frequency (RF) signals. In some embodiments, such signals are in accordance with an 802.11 (Wi-Fi), Bluetooth, or ZigBee standard.

In some embodiments, the server 200 is not proximate to the client device 300 and/or does not have wireless capabilities or such wireless capabilities are not used for the purpose of determining and providing a product roadmap investment decision and risk assessment. In such embodiments, a communication network 106 is utilized to communicate a determination of a product roadmap investment decision and risk assessment to a client device 300. In some embodiments, the communication network 106 is utilized to communicate a request for such a determination from the client device 300 to the server 200.

Examples of communication networks 106 include, but are not limited to, the World Wide Web (WWW), an intranet and/or a wireless network, such as a cellular telephone network, a wireless local area network (LAN), one or more wide area networks (WAN), a metropolitan area network (MAN), and other devices by wireless communication, or a combination thereof. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSDPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of the present disclosure.

Of course, other topologies of the system 100 other than the one depicted in FIG. 1 are possible. For instance, in some embodiments, rather than relying on a communications network 106, the server 200 wirelessly transmits information directly to the client device 300. Further, in some embodiments, the server 200 constitutes a portable electronic device, a server computer, or in fact constitute several computers that are linked together in a network, or are instantiated as one or virtual machines and/or containers in a cloud-computing context. As such, the example topology shown in FIG. 1 merely serves to describe the features of an embodiment of the present disclosure in a manner that will be readily understood to one of skill in the art.

Turning to FIGS. 2A and 2B with the foregoing in mind, in some embodiments, the server 200 includes one or more computers. For purposes of illustration in FIGS. 2A and 2B, server 200 is represented as a single computer that includes all of the functionality for determining a product roadmap investment decision and risk assessment of a candidate subject. However, the present disclosure is not limited thereto. In some embodiments, the functionality for providing a server 200 is spread across any number of networked computers, and/or resides on each of several networked computers, and/or is hosted on one or more virtual machines and/or one or more containers at a remote location accessible across the communications network 106. One of skill in the art will appreciate that any of a wide array of different computer topologies are used for the application and all such topologies are within the scope of the present disclosure.

An example server 200 for determining a product roadmap investment decision and risk assessment of a candidate subject is provided. The server 200 includes one or more processing units (CPUs) 274, a network or other communications interface 284, a memory 192 (e.g., a random-access memory), one or more magnetic disk storage and or persistent devices 290 optionally accessed by one or more controllers 288, one or more communication busses 112 for interconnecting the aforementioned components, and, optionally, a user interface 278, and a power supply 276 for powering the aforementioned components. In some embodiments, the user interface 278 includes a display 282 and input 280 (e.g., keyboard, keypad, touch screen). In some embodiments, a plurality of data elements in the memory 192 are seamlessly shared with non-volatile memory 290 using known computing techniques such as caching. In some embodiments, the memory 192 and/or memory 290 includes mass storage that is remotely located with respect to the central processing unit(s) 274. In other words, some data stored in the memory 192 and/or memory 290 may be hosted on computers that are external to the server 200 but that can be electronically accessed by the server 200 over an Internet, intranet, or other form of network or electronic cable (illustrated as element 106 in FIG. 2A) using network interface 284.

In some embodiments, the memory 192 of the server 200 includes:

instructions, programs, data, or information associated with an operating system 8 (e.g., iOS, ANDROID, DARWIN, RTXC, LINUX, OS X, WINDOWS, or an embedded operating system such as VxWorks), which includes various software components and/or drivers for controlling and managing general system tasks (e.g., memory management, storage device control, and/or power management) and facilitates communication between various hardware and software components;

an electronic address 10 associated with the server 200;

a language model store 11 that stores one or more language models (e.g., large language models and/or other forms of generative artificial intelligence);

a data gathering mechanism store 12 that includes a plurality of data gathering mechanisms 14 (e.g., first data gathering mechanism 14-1, second data gathering mechanism 14-2, . . . data gathering mechanism R 14-R) for obtaining a plurality of data elements from one or more sources in accordance with a corresponding plurality of heuristic instructions 16 associated with a respective data gathering mechanism 14;

a classification model store 18 that stores a plurality of classification models 20 (e.g., first classification model 20-1, second classification model 20-2, . . . classification model S 20-S) that facilitates classifying a plurality of data elements and/or forming a plurality of variables (e.g., first variable 28-1 of FIG. 2B) and a plurality of classifications (e.g., first classification 26-1 of FIG. 2B, second classification 26-2 of FIG. 2B, etc.) based on the classification 26 of the plurality of data elements;

a taxonomy store 22 that retains one or more taxonomies of data (e.g., first taxonomy of data 24-1 of FIG. 2B), each respective taxonomy of data 24 including a corresponding plurality of classifications (e.g., first classification 26-1 of first taxonomy of data 24-1) and variables 28 (e.g., second variable 28-2 of second classification 26-2 of first taxonomy of data 24-1) utilized for storing data elements associated with the classification 26;

a statistical model store 30 that includes a plurality of statistical models 32 utilized to define a respective output (e.g., a customer segment, a risk assessment, etc.) and/or provide an evaluation of the respective output in accordance with a corresponding plurality of heuristic instructions 16;

a reporting module 34 for communicating with one or more remote devices (e.g., in conjunction with the network interface 284) and/or one or more users (e.g., in conjunction with the user interface 278). In some embodiments, the reporting module 34 provides a determination of a product roadmap investment decision and risk assessment of a candidate subject to one or more client devices 300; and a scoring module 36 for generating, receiving, and/or assigning scores and measures of importance. In some embodiments, the scoring module 36 ranks and/or recommends features and/or actions based the scores/measures.

An electronic address 10 is associated with the server 200, which is utilized to at least uniquely identify the server 200 and a respective client device 300 from other devices and components of the system 100.

A data gathering mechanism store 12 includes a plurality of data gathering mechanisms 14 that obtain a plurality of data elements associated with a candidate subject. In some embodiments, each candidate subject is a subject matter defined by a user (e.g., a job, a product, and/or a customer need). One example of a candidate subject is as an investment including a new feature idea and/or a new product (e.g., a new consumer product, a new client application 320 of FIG. 3). Another example of a candidate subject is a new process for workflow optimization or the like. For instance, referring briefly to FIG. 5B, a user interface 500-2 illustrates a first user (e.g., "User 1" of FIG. 5B) that inputs a candidate subject of a new feature idea of "Determine the optimal sequence to make planned stops."

In some embodiments, the candidate subject is a multi-stage process, such as one that is relied upon in the research and manufacture of a wide range of products including biologics, pharmaceuticals, mechanical devices, electrical devices, and food, to name a few examples. One such example of a multi-stage process is a laundry soap packaging line designed to fill each laundry soap box with a set amount of laundry soap.

By allowing the server 200 to obtain the plurality of data elements based on the candidate subject that is provided by the user of the client device 300, the server 200 is capable of providing a determination of a product roadmap investment decision and risk assessment without, or with exceptionally limited, restrictions.

Each respective data gathering mechanism 14 includes a corresponding plurality of heuristic instructions (e.g., first data gathering mechanism 14-1 includes first heuristic instructions 16-1 of FIG. 2A), which define how a respective data gathering mechanism 14 obtains the plurality of data elements from a respective source (e.g., client device 300 of FIG. 3). Moreover, in some embodiments, the corresponding plurality of heuristic instructions 16 define how a respective data gathering mechanism 14 determines if a data element in the plurality of data elements is associated with a candidate subject. In some embodiments, the data gathering mechanism 14 uses, and/or includes, one or more language models configured to output one or more data elements. In some embodiments, the language model store 11 is part of the data gathering mechanism store 12 (e.g., one or more of the data gathering mechanisms 14 involve the use of a language model).

In some embodiments, the server 200 receives at least 10 data elements in the plurality of data elements, at least 20 data elements in the plurality of data elements, at least 30 data elements in the plurality of data elements, at least 40 data elements in the plurality of data elements, at least 50 data elements in the plurality of data elements, at least 60 data elements in the plurality of data elements, at least 70 data elements in the plurality of data elements, at least 80 data elements in the plurality of data elements, at least 90 data elements in the plurality of data elements, at least 100 data elements in the plurality of data elements, at least 200 data elements in the plurality of data elements, at least 300 data elements in the plurality of data elements, at least 400 data elements in the plurality of data elements, at least 500 data elements in the plurality of data elements, at least 1,000 data elements in the plurality of data elements, at least 5,000 data elements in the plurality of data elements, at least 5,000 data elements in the plurality of data elements, at least 15,000 data elements in the plurality of data elements, at least 25,000 data elements in the plurality of data elements, at least 50,000 data elements in the plurality of data elements, or at least 250,000 data elements in the plurality of data elements. In some embodiments, the plurality of data elements received by the server 200 includes a range of data elements from about 1 data element to about 10 data elements, from about 5 data elements to about 25 data elements, from about 20 data elements to about 45 data elements, from about 25 data elements to about 60 data elements, from about 30 data elements to about 90 data elements, from about 50 data elements to about 100 data elements, from about 50 data elements to about 200 data elements, from about 100 data elements to about 200 data elements, from about 100 data elements to about 500 data elements, from about 250 data elements to about 1,000 data elements, from about 250 data elements to about 2,500 data elements, from about 500 data elements to about 5,000 data elements, from about 1,000 data elements to about 10,000 data elements, from about 5,000 data elements to about 50,000 data elements, from about 25,000 data elements to about 500,000 data elements, a combination thereof.

In some embodiments, the plurality of data gathering mechanisms 14 obtains a data element in a first data format and coverts the data element into a second data format in order to structure the data element into a taxonomy of data (e.g., first taxonomy of data 24-1 of FIG. 2B). In some embodiments, for this single data element, the taxonomy of data includes a plurality of unit operations (e.g., two or more, three or more, four or more, five or more, six or more, 10 or more, or 20 or more unit operations). By way of example, in some embodiments, a first data gathering mechanism 14-1 in the plurality of data gathering mechanism 14 converts a data element from an unstructured data format to a structured data format. For instance, consider a data element describing a polynomial equation in unstructured plain text and the first data gathering mechanism 14-1 in the plurality of data gathering mechanism 14 converts the data element from the unstructured plain text format to a structured data format that defines each variable of the polynomial equation and deconstructs the polynomial equation into a plurality of unit operations. In some embodiments, each of these unit operations is considered a classification 26 of the taxonomy 24.

In some embodiments, the data element is in a first data format and the second data format is a second data format other than the first format. For example, in some embodiments, the first data format is a sound recorded in an uncompressed audio format, pulse-code modulation (PCM) format, waveform audio file (WAV) format, audio interchange file format (AIFF), MPEG-Audio Layer 3 (MP3) format, advanced audio coding (AAC) format, OGG (Vorbis) format, WINDOWS media audio (WMA) format, free lossless audio (FLAC) format, APPLE lossless audio codec (ALAC) format, WINDOWS media audio (WMA) format, or some other format and the second data format is text (e.g., ASCII text). As a non-limiting example of this, in some embodiments, a second data gathering mechanism 14-2 in the plurality of data gathering mechanisms 14 converts a data element in one of the above-described audio data formats, which includes a conversation with a customer, into a corresponding text file format that includes a transcript of the conversation with the customer.

As another example, in some embodiments, the first data format is video and sound recorded in a video container (e.g., MP4, 3GP, 3G2, etc.) and the second data format is text (e.g., ASCII text).

In some embodiments, a user of a client device 300, such as a customer associated with a candidate subject, utilizes the client device 300 to input a plurality of data elements in a variety of data formats (e.g., one or more text data formats, one or more audio data formats, one or more video data formats, one or more document data formats, etc.), which is communicated to the server 200. However, the present disclosure is not limited thereto.

In some embodiments, a plurality of data elements exists on a remote device (e.g., a remote server different than server 200) and the plurality of data elements that is obtained by the plurality of data gathering mechanism 14 through the communications network 106. In such embodiments, the plurality of data elements is obtained by the system 100 in various data formats (e.g., two or more formats, three or more formats, four or more formats), such as a native format of a source of a respective data element (e.g., a first data element associated with a picture is obtained from a first source in a compressed format and a second data element associated with the picture is obtained from a second source in an uncompressed format). Moreover, the system 100 allows for obtaining a robust collection of data elements by having the plurality of data gathering obtain data elements from a remote device. As a non-limiting example, in some embodiments, a respective data gathering mechanism 14 in the plurality of data gathering mechanisms 14 includes a corresponding plurality of heuristic instructions 16 that define how the respective data gathering mechanism 14 obtain a plurality of data elements based on a linguistic aspect of the plurality of data elements, such as a human language aspect (e.g., Cantonese or English) or a machine-readable aspect (e.g., pragmatics of a source code) or a subject matter associated with the plurality of data objects (e.g., customer behaviors, searches, customer purchases, customer calls, product usage, usability testing and tracking, customer feedback, support tickets, technology-triggered events within a product, etc.). For instance, in some embodiments, a first data gathering mechanism 14-1 includes a first plurality of heuristic instructions 16-1 that define how the first data gathering mechanism 14-1 obtains a plurality of data elements from computer readable code, such as source code (e.g., HTML, C code, C++ code, Python, PERL, JAVA, etc.), of a client application or an online page. In some embodiments, a second data gathering mechanism 14-2 includes a second plurality of heuristic instructions 16-2 that define how the second data gathering mechanism 14-2 obtains a plurality of data elements from one or more online pages (e.g., a uniform resource locator (URL) address associated with an online page). Additional details and information regarding the gathering of data can be found at Mughal et al., 2018, "Data Mining: Web Data Mining Techniques, Tools and Algorithms: An Overview," Information Retrieval, 9(6), print; Timonin et al., 2016, "The Process of Personal Identification and Data Gathering Based on Big Data Technologies for Social Profiles," International Conference on Digital Transformation and Global Society, 576; each of which is hereby incorporated by reference in its entirety.

The taxonomy store 22 includes a plurality of taxonomies in some embodiments (e.g., as illustrated in FIG. 2B) and only a single taxonomy in other embodiments. In some embodiments, there is a 1:1 ratio between (i) the number of candidate subjects considered by server 200 and (ii) the number of taxonomies 24 in taxonomy store 22 since each taxonomy 22 is formed in response to obtaining a plurality of data elements associated with a candidate subject. However, it is quite possible that a single candidate element will be associated with (converted into) more than one taxonomy. For example, consider the case where there are two candidate subjects that are closely related, such as one candidate subject that is "Electric vehicle" and another candidate subject that is "Diesel vehicle." In such instances, the two respective taxonomies for "Electric vehicle" and "Diesel vehicle" may share common data elements (e.g., data elements obtained that are related to trends in consumer vehicle purchases).

A classification model store 18 includes a plurality of classification models 20 that facilitate filtering and classifying (e.g., classifications 26 of FIG. 2B) the plurality of data elements (e.g., data elements obtained by one or more data gathering mechanisms 14). In some embodiments, the classifying of the plurality of data elements into a plurality of classifications 26 of a taxonomy of data 24 further includes defining one or more variables (e.g., variables 28 of FIG. 2B) associated with each respective classification 26 in the plurality of classifications 26 formed by the plurality of classification models 20. In some embodiments, the scoring module 36 is part of the classification model store 18 (e.g., classifying the plurality of data elements includes assigning a score and/or ranking). For instance, in some embodiments, the classifying of the plurality of data elements by the plurality of classification models 20 defines a respective variable 28 in the one or more variables 28 as a control variable 28. In some embodiments, the control variable 28 provides a static boundary condition when providing a determination of a product roadmap investment decision and risk assessment of a candidate subject, such as a threshold accuracy for providing the determination. In some embodiments, the control variable 28 is defined by the user, such as first customer effort variable 28-1 of FIG. 5H, which is user defined through user interface 500-8 as 85 (e.g., on a dimensionless scale of 1-100). In some embodiments, the classifying of the plurality of data elements by the plurality of classification models 20 defines a respective variable 28 in the one or more variables 28 as an input variable 28, which can be configured by either a user of a client device 300 or the server 200. In this way, in some embodiments, the input variable 28 is defined exclusively by the server without human intervention, such as in accordance with an evaluation of the plurality of data elements obtained by the plurality of data gathering mechanisms 14. In this way, the server 200 enables the obtaining and classifying of the plurality of data elements to form a robust collection of data elements as a taxonomy of data 24, which is a basis for forming a determination of a product roadmap investment decision and risk assessment of a candidate subject.

As a non-limiting example, a plurality of data gathering mechanisms 14 (e.g., one or more search data gathering mechanism 14, one or more analog to digital conversion data gathering mechanisms 14, one or more user input interface data gathering mechanism 14, or one or more survey data gathering mechanisms 14) obtains a plurality of data elements that is analyzed by the plurality of classification models 20. Accordingly, based on a plurality of heuristic instructions 16 associated with a respective classification model 20 in the plurality of classification models 20, the plurality of data elements is structured into a first classification 26-1 of data elements and a second classification 26-2 of data elements that are each associated with the candidate subject. As such, the plurality of classification models 20 form one or more subsets of the plurality of data elements within each respective classification 26 of a given taxonomy 24. By way of example, in some embodiments, a first classification 26-1 is a first subset of relevant data elements in the plurality of data elements for the product roadmapping investment decisions and risk assessment determination and a second classification 26-2 is non-relevant data elements in the plurality of data elements as determined by the plurality of classification models 20. Accordingly, in some embodiments, the first subset of data elements is further analyzed by one or more classification models 20 in the plurality of classification models 20 and re-classified into a given taxonomy of data 24, such as a first taxonomy of data 24-1 including a product investment decision profile cauterization and a risk assessment profile fourth classification 26-4. Various data elements that are determined not relevant, and thus belonging to the second classification 26-2, are analyzed again with the plurality of classification models 20 and compared with the data elements of the relevant first classification 26-1, and further classified into the given taxonomy of data 24 (e.g., taxonomy 24-1). In some embodiments, the plurality of classifications 26 include a product investment decision profile fifth classification 26-5, a risk assessment profile sixth classification 26-6, and a final not relevant data element seventh classification 26-7, or any sub-combination thereof.

A taxonomy store 22 includes one or more taxonomies of data 24 that each stores a respective subset of the plurality of data elements. In some embodiments, a taxonomy of data 24 is formed based on output from a language model. In some embodiments, data elements are assigned to a taxonomy based on output from a language model. The data elements that are stored in any respective taxonomy of data 24 of the taxonomy store 22 is based on the one or more corresponding classifications 26 associated with the respective taxonomy of data 24 as illustrated, for example, in FIG. 2B. In some embodiments, the subset of the plurality of data elements includes less than all of the plurality of data elements, which allows the server 200 to optimize storage of various data elements that are associated with a candidate subject by filtering such data elements obtained by one or more data gathering mechanisms 14 that are not pertinent to the candidate subject. Moreover, in some embodiments, this optimization of storage is facilitated by forming a taxonomy of data 24 with structured data and/or one or more predetermined data structures, which adds cohesion to a plurality of data elements obtained in a variety of disparate forms from one or more sources by the plurality of data gathering mechanisms 14. In some embodiments, each classification 26 is associated with an aspect of providing a determination for a product roadmapping investment decisions and risk assessment of a candidate subject, such as a first classification 26-1 of one or more types of customers 26-1 (e.g., a first grouping of customers in the first classification 26-1 with an age from 18 years old to 35 years old, a second grouping of customers in the first classification 26-1 in a particular geographic region, etc.), a second classification 26-2 of one or more markets, a third classification 26-3 of one or more unmet customer needs, a fourth classification 26-4 of known competitor products or services, and the like (e.g., classifications 26 of FIG. 6E). As such, in some embodiments, classifications are used to segment a population based on some criterion or combination of criteria (e.g., age, income, sex, health status, net worth, number of stock trades made in a given time period, number of units of a given product purchased in a time period, total value of product purchased in a given time period, or any combination or sub-combination thereof).

In some embodiments, the plurality of data elements is stored in any form of data storage format or structure on the server 200 including, but not limited to, a flat file, a relational database (SQL), or an on-line analytical processing (OLAP) database (MDX and/or variants thereof). In some embodiments, as associated data is stored in a single database. In some embodiments, associated data is stored in a plurality of databases that may or may not all be hosted by the same server 200. In some such embodiments, some components as well as associated data are stored on computing systems that are not illustrated by FIG. 1 but that are addressable by the communications network 106.

In some embodiments, a particular taxonomy of data 24 (e.g., taxonomy of data 24-1) includes a first classification 26-1 associated with a product investment decision profile of a candidate subject. In some embodiments, the particular taxonomy of data 24 includes a second classification 26-2 associated with a risk assessment profile of the candidate subject. Additionally, in some embodiments, the particular taxonomy of data 24 includes a third classification 26-3 associated with one or more data elements that is not relevant to the candidate subject, which allows for such non-relevant data elements to be utilized for future evaluations of the candidate subject.

A statistical model store 30 stores a plurality of statistical models (e.g., first statistical model 32-1, second statistical model 32-3, . . . , statistical model B 32-B of FIG. 2B) that is utilized in (i) determining a respective output and/or (ii) evaluating a respective output against a plurality of threshold criteria. For each respective statistical model 32 in the plurality of statistical models 32, this determining and/or evaluating by the plurality of statistical models 32 is conducted in accordance with a corresponding plurality of heuristic instructions 16, which define how a respective statistical model 32 determines at a respective outcome, such as pricing. In some embodiments, a statistical model of the plurality of statistical models is a language model. For example, the language model determines a respective outcome in accordance with an input prompt and operating instructions. In some embodiments, the plurality of statistical models 32 determine and evaluate a respective output that includes a customer segment from a range of customer segments (e.g., ranging from capturing no customers to all customers of a market). In some embodiments, the plurality of statistical models 32 correct for a statistical variation when determining and/or evaluation of a respective output, such as a standard deviation in a respective classification 26 of the taxonomy of data 24, an interquartile range of the respective classification 26 of the taxonomy of data 24, a measure of central tendency (e.g., arithmetic mean, weighted mean, midrange, midhinge, trimean, geometric mean, geometric median, Winsorized mean, median, and/or mode) of the respective classification 26 of the taxonomy of data 24 and the like.

In some embodiments, a respective statistical model 32 in the plurality of statistical models 32 provides a determination of a measure of a risk assessment when evaluating a respective output of the determination. In some embodiments, the measure of the risk assessment is a maximum on return and minimal risk, such as given a first control variable 28-1 and a second control variable 28-2 that are provided by the user with mean returns $\mu_1$, $\mu_2$ and standard deviations $\sigma_1$, $\sigma_2$, respectively, $V_1$ is preferred to $V_2$ in accordance with a determination that $\mu 1$ is greater than or equal to $\mu_2$ and $\sigma_1$ is less than or equal to $\sigma_2$. In some embodiments, $V_1$ and $V_2$ have no relative preference in accordance with a determination that $\mu_1$ is not greater than or equal to $\mu_2$ or and $\sigma_1$ is not less than or equal to $\sigma_2$. Moreover, in other embodiments, the measure of a risk assessment is a value at risk that is a quantification of a determination of level of exposure in a candidate subject that a user can define, at least in part, based on a relative confidence level (e.g., confidence of 85%). Accordingly, the value of risk is a threshold probability criterion (e.g., 15% in the case of 85% confidence). Thus, when a respective variable 28 representative of a candidate subject (X) that can lead to a loss in investment is randomly selected (e.g., defined on a probability space), then a smallest acceptable level of this loss (x) exists, such that $P(X>x)<\alpha$ when $\alpha \in [0,1]$. Additional details and information regarding statistical models 32 can be found at Elliot et. al., 1999, "Mathematics of Financial Markets," Springer Finance, second edition, print, which is hereby incorporated by reference in its entirety.

In some embodiments, a reporting module 34 facilitates generating and configuring one or more user interfaces (e.g., user interfaces 500 of FIG. 5A through 5M, user interfaces 600 of FIGS. 6A through 6E, and user interfaces of FIGS. 7A through 7D), e.g., for displaying a determination of a product roadmap investment decision and risk assessment of a candidate subject at a client device 300.

In some embodiments, one or more of the above identified data stores and/or modules of the server 200 are stored in one or more of the previously described memory devices (e.g., memory 192 and/or memory 290), and correspond to a set of instructions for performing a function described above. The above-identified data, modules, or programs (e.g., sets of instructions) need not be implemented as separate software programs, procedures, or modules. Thus, various subsets of these modules may be combined or otherwise re-arranged in various implementations. In some implementations, the memory 192 and/or memory 290 optionally stores a subset of the modules and data structures identified above. Furthermore, in some embodiments the memory 192 and/or memory 290 stores additional modules and data structures not described above.

Referring to FIG. 3, a description of an example client device 300 (e.g., first client device 300-1) that can be used with the present disclosure is provided. In some embodiments, a client device 300-1 includes a smart phone (e.g., an iPhone, an Android device, etc.), a laptop computer, a tablet computer, a desktop computer, a wearable device (e.g., a smart watch, a smart garment, a heads-up display (HUD) device, etc.), a television (e.g., a smart television), or another form of electronic device such as a gaming console, a stand-alone device, and the like. However, the present disclosure is not limited thereto.

The client device 300 illustrated in FIG. 3 has one or more processing units (CPU's) 302, a network or other communications interface 304, a memory 312 (e.g., random access memory), a user interface 306, the user interface 306 including a display 308 and input 310 (e.g., keyboard, keypad, touch screen, etc.), an optional input/output (I/O) subsystem 330, a power supply 340, one or more communication busses 314 for interconnecting the aforementioned components, or a combination thereof.

In some embodiments, the user interface 306, the display 308, the input 310, or a combination is as described with respect to the corresponding user interface 278, the corresponding display 282, the corresponding input 280, or the combination thereof of the server 200. For instance, in some embodiments, the input 310 is a touch-sensitive display 308, such as a touch-sensitive surface. In some embodiments, the user interface 306 includes one or more soft keyboard embodiments. In some embodiments, the soft keyboard embodiments include standard (QWERTY) and or non-standard configurations of symbols on the displayed icons. The input 310 and/or the user interface 306 is utilized by an end-user of the respective client device 300 (e.g., a respective subject) to input various commands (e.g., a push command) to the respective client device 300.

It should be appreciated that the client device 300 illustrated in FIG. 3 is only one example of a multifunction device that may be used with the present disclosure. Thus, a client device 300 optionally has more or fewer components than shown, optionally combines two or more components, or optionally has a different configuration or arrangement of the components. The various components shown in FIG. 3 are implemented in hardware, software, firmware, or a combination thereof, including one or more signal processing and/or application specific integrated circuits.

Memory 312 of the client device 300 illustrated in FIG. 3 optionally includes high-speed random-access memory and optionally also includes non-volatile memory, such as one or more magnetic disk storage devices, flash memory devices, or other non-volatile solid-state memory devices.

In some embodiments, the network interface 304 converts electrical signals to from electromagnetic signals and communicates with network 106 and other communications devices, client devices 300 (e.g., a second client device 300-2, client device R 300-R, etc.), and/or the server 200 via the electromagnetic signals. The network interface 304 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The network interface 304 optionally communicates with the network 106. In some embodiments, the network interface 304 does not include RF circuitry and, in fact, is connected to the communication network 106 through one or more hard wires (e.g., an optical cable, a coaxial cable, or the like).

In some embodiments, the memory 312 of the client device 300 stores:

- an operating system 316 that includes procedures for handling various basic system services;
- an electronic address 318 associated with the client device 300-1; and
- a client application 320 for presenting one or more user interfaces (e.g., user interfaces 500 of FIGS. 5A through 5M, user interfaces 600 of FIGS. 6A through 6E, and user interfaces of FIGS. 7A through 7D), such as a first user interface for communicating a request for a determination of a product roadmap investment decision and risk assessment of a candidate subject and/or a second user interface receiving the determination of the product roadmap investment decision and risk assessment of the candidate subject.

As illustrated in FIG. 3, a client device 300 preferably includes an operating system 316 that includes procedures for handling various basic system services. The operating system 316 (e.g., iOS, ANDROID, DARWIN, RTXC, LINUX, UNIX, OS X, WINDOWS, or an embedded operating system such as VxWorks) includes various software components and or drivers for controlling and managing general system tasks (e.g., memory management, storage device control, power management, etc.) and facilitates communication between various hardware and software components.

An electronic address 318 is associated with each client device 300, which is utilized to at least uniquely identify a client device 300 from other devices and components of the system 100. In some embodiments, the client device 300 includes a serial number, and optionally, a model number or manufacturer information that further identifies the client device 300. In some embodiments, the electronic address 318 associated with the client device 300 is used to provide a source of a request communicated from the client device 300 (e.g., a request for a determination of a product roadmap investment decision and risk assessment of a candidate subject), or to receive such a determination of a product roadmap investment decision and risk assessment of a candidate subject.

Figure 5A:
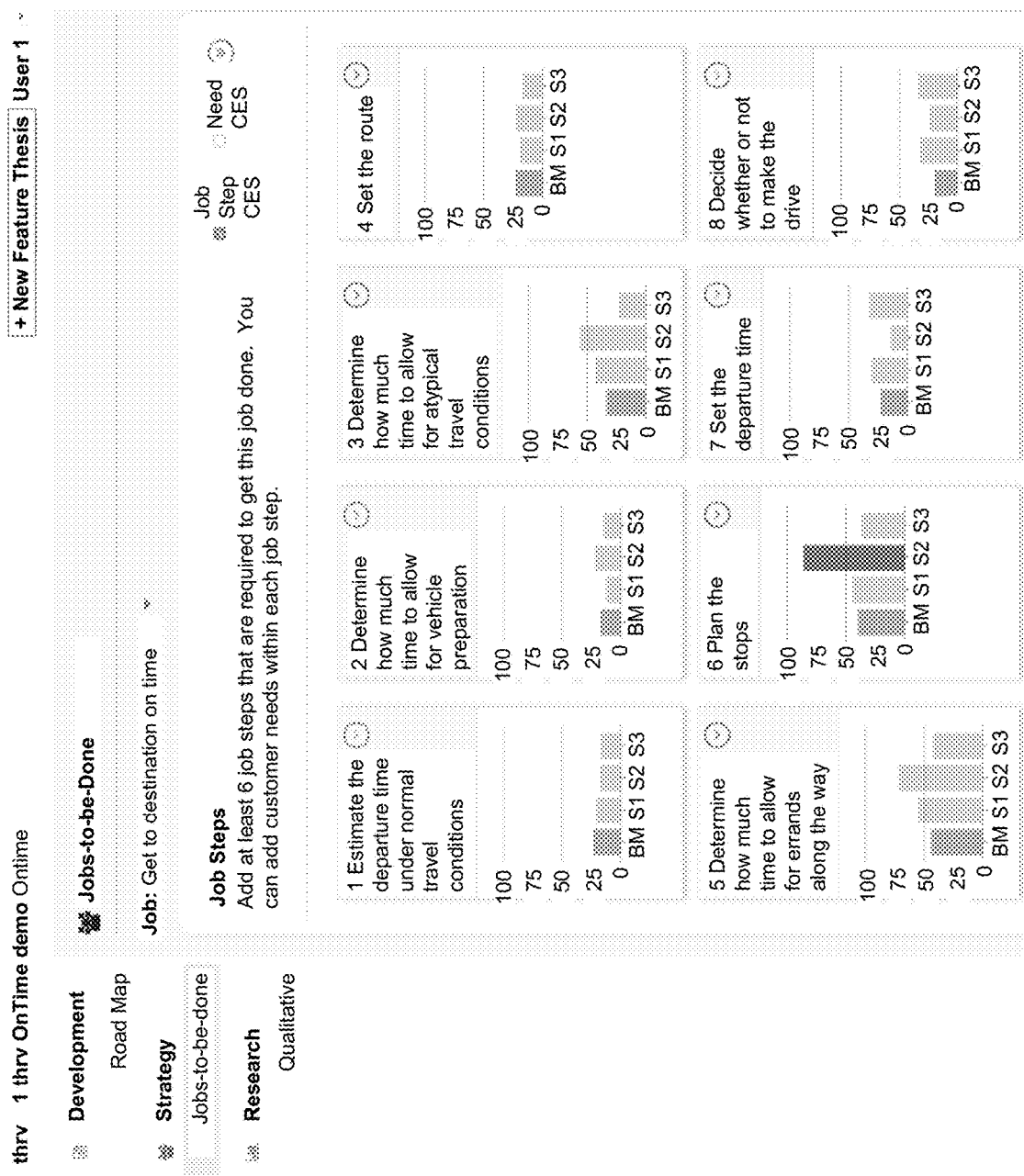
Figure 5D:
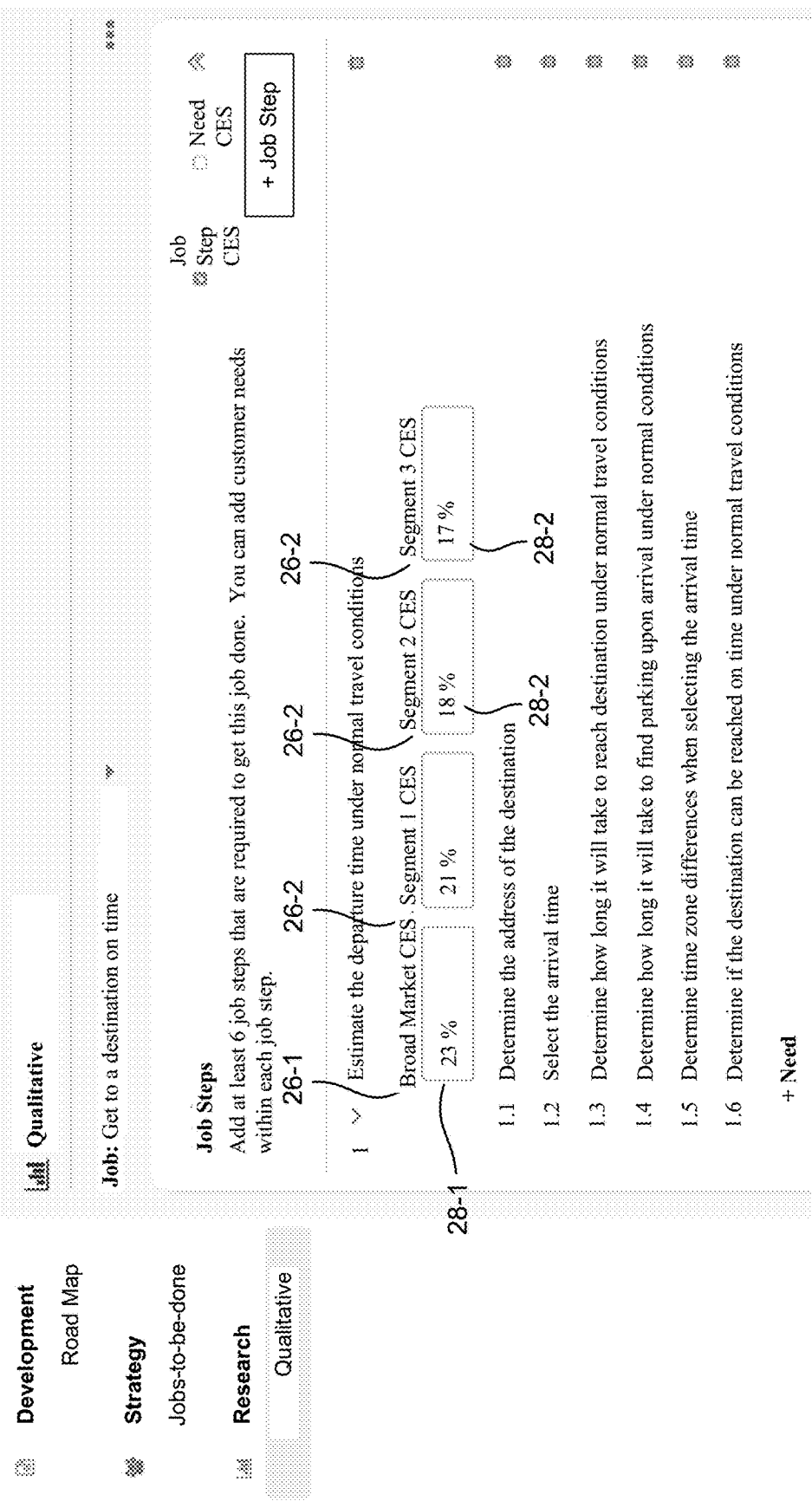
Figure 5F:
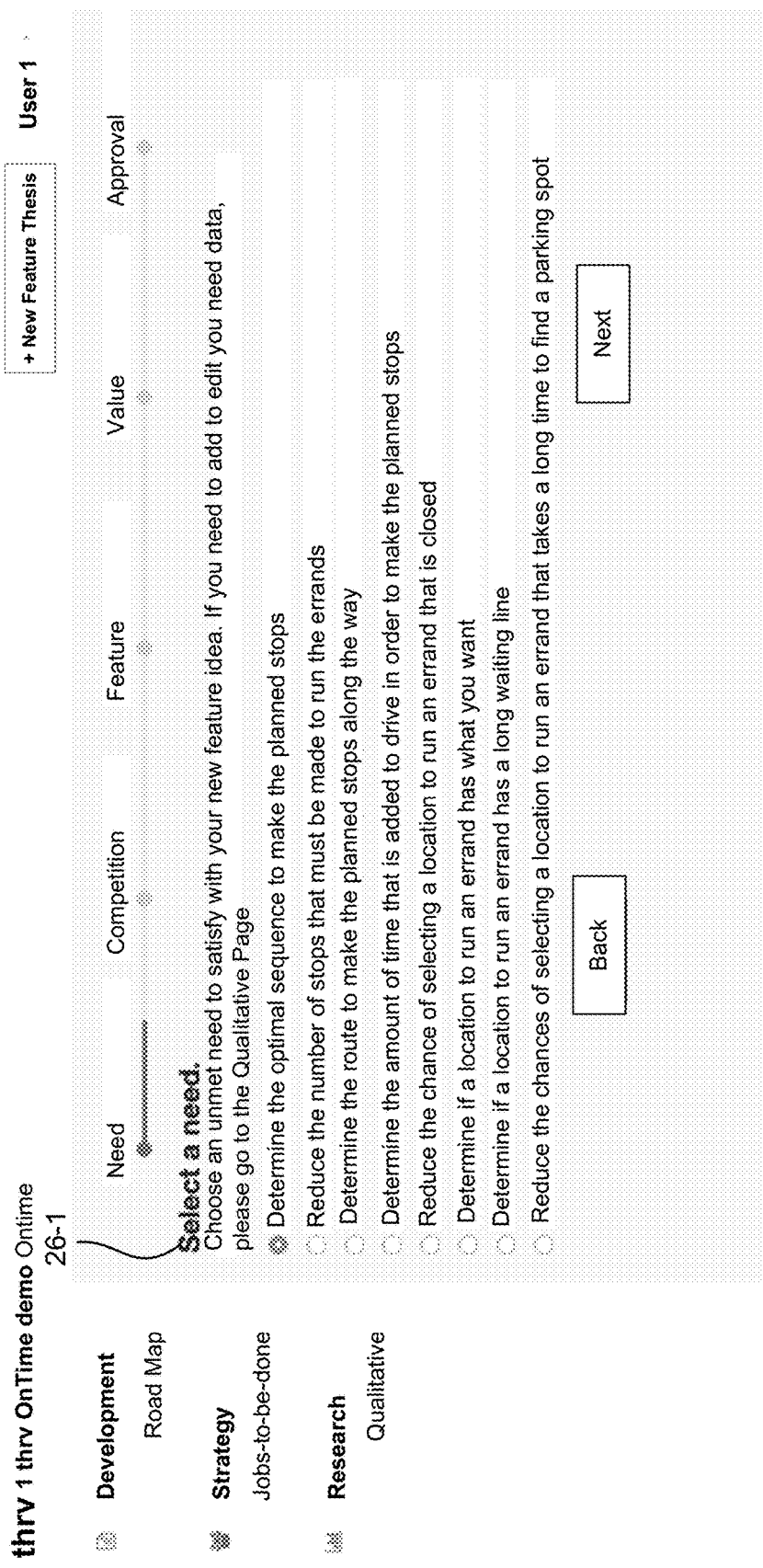
Figure 5G:
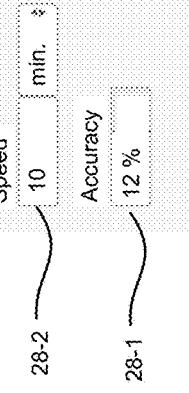
Figure 5I:
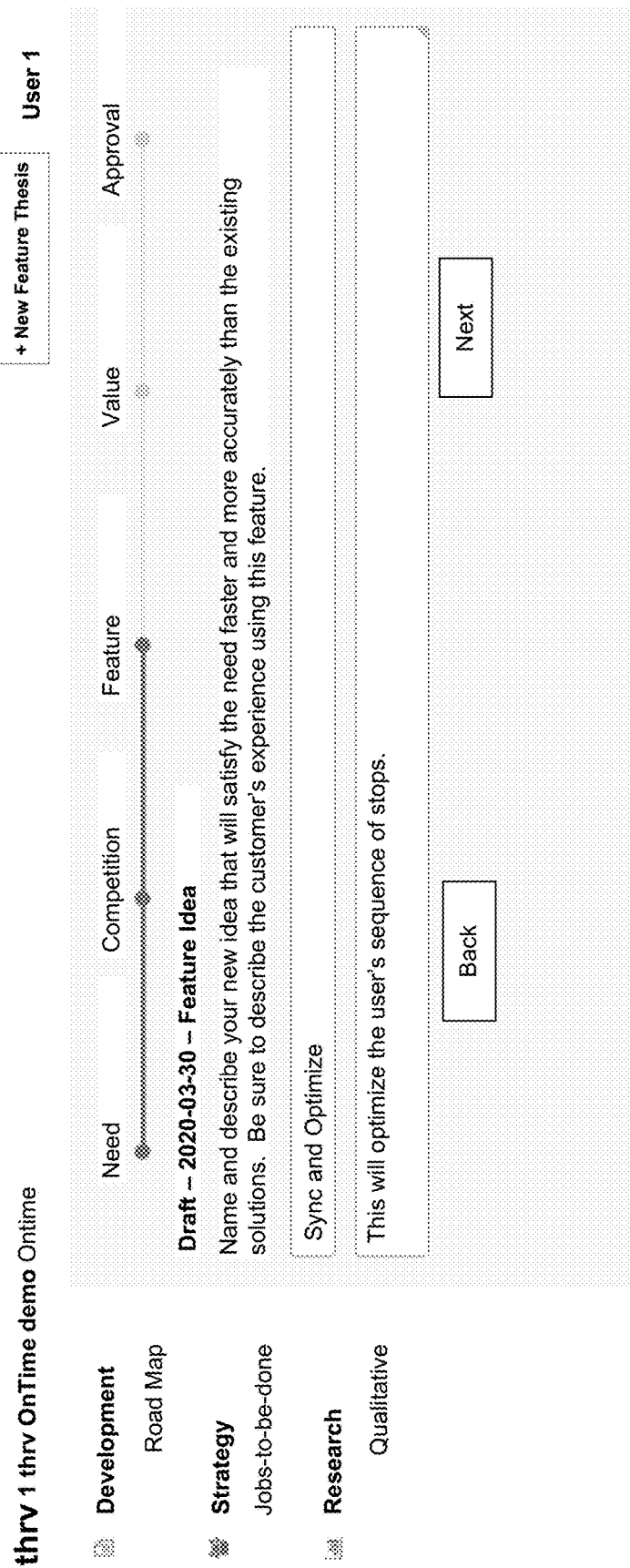
Figure 5K:
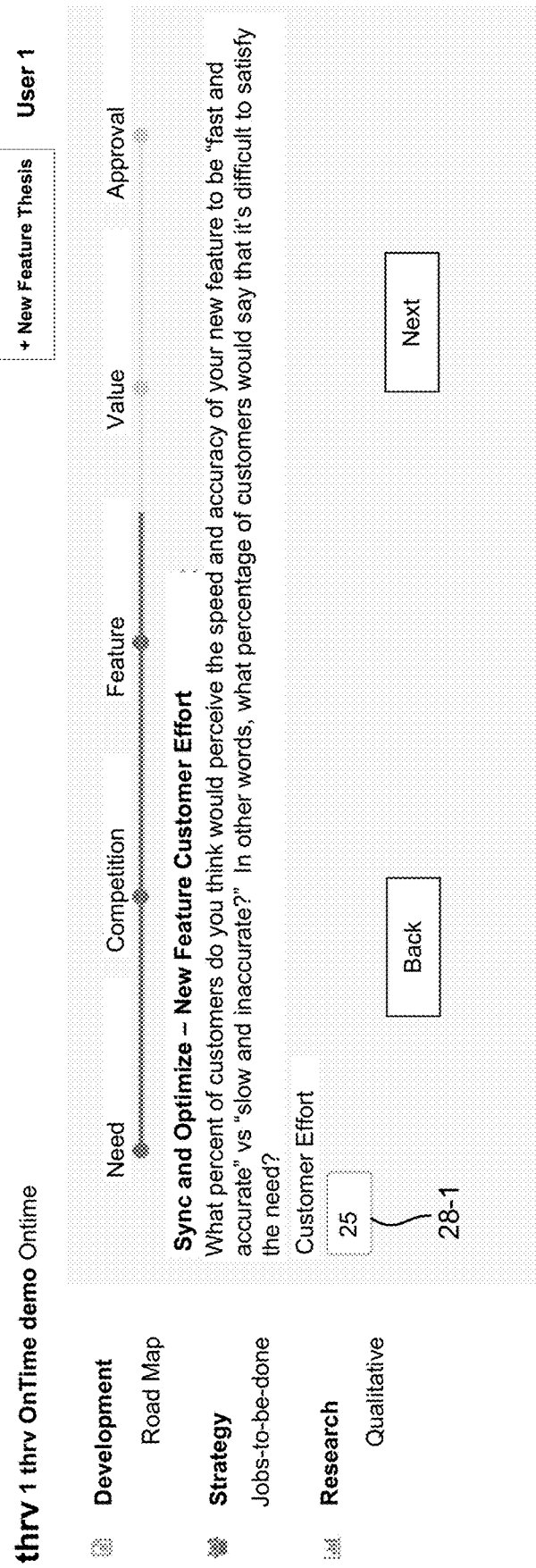

A client application 320 is a group of instructions that, when executed by a processor (e.g., CPU(s) 302), generates content (e.g., a visualization of a determination of a product roadmap investment decision and risk assessment of a candidate subject provided by the server 200 on the display 308 of the client device 300; user interface 500-1 of FIG. 5A; user interface 500-2 of FIG. 5B; user interface 500-3 of FIG. 5C; user interface 500-4 of FIG. 5D; user interface 500-5 of FIG. 5E; user interface 500-6 of FIG. 5F; user interface 500-7 of FIG. 5G; user interface 500-8 of FIG. 5H; user interface 500-9 of FIG. 5I; user interface 500-10 of FIG. 5J; user interface 500-11 of FIG. 5K; user interface 500-12 of FIG. 5L; user interface 500-13 of FIG. 5M; user interface 600-1 of FIG. 6A; user interface 600-2 of FIG. 6B; etc.) for presentation to a user of the client device 300.

In some embodiments, the client application 320 generates content in response to one or more inputs received from the user through the user interface 306 of the client device 300. For instance, in some embodiments, the client application 320 includes a data presentation application for viewing the contents of a file or web application that includes the determination of the product roadmap investment decision and risk assessment of the candidate subject (e.g., in the form of graph, charts, tables, drop down menus, etc.). By way of example, in some embodiments, a user of a client device 300, such as a customer for a candidate subject, utilizes the client device 300 to input to the system 100 a plurality of data elements in one or more data formats (e.g., one or more text data formats, one or more audio data formats, one or more video recordings, documents, etc.).

In various embodiments, the client device 300 includes one or more processing units (CPUs), a network or other communications interface, a memory (e.g., a random-access memory), one or more magnetic disk storage and/or persistent device optionally accessed by one or more controllers, one or more communication busses for interconnecting the aforementioned components, and a power supply for powering the aforementioned components. In some embodiments, data in memory is seamlessly shared with non-volatile memory using known computing techniques such as caching. In some embodiments, memory and/or memory is hosted on computers that are external to the recommendation system but that can be electronically accessed by the recommendation system over an Internet, intranet, or other form of network or electronic cable using a network interface.

In some embodiments, the client device 300 has any or all of the circuitry, hardware components, and software components found in the system depicted in FIG. 3. In the interest of brevity and clarity, only a few of the possible components of the client device 300 are shown to better emphasize the additional software modules that are installed on the client device 300.

Now that details of a computing system 100 for determining and providing a product roadmap investment decision and risk assessment of a candidate subject have been described, details regarding a flow chart of processes and features for implementing a method determining and providing a product roadmap investment decision and risk assessment of a candidate subject (e.g., method 400 of FIG. 4A), in accordance with an embodiment of the present disclosure, are disclosed with reference to FIG. 4.

Block 402. Referring to block 402 of FIG. 4, a method 400 is provided for determining a product investment decision and risk assessment. In some embodiments, the product investment decision and risk assessment includes a quantitative decision and risk assessment, such as a determination of a return on an investment, a value of story points in agile, a number of dollars per hour, a value of time needed for development of a candidate subject, and the like. However, the present disclosure is not limited thereto. For instance, in some embodiments, product investment decision and risk assessment are a subjective opinion that is provided by a user of present disclosure and confirmed, at least in part, by the determination of the product investment decision and risk assessment.

Block 404. Referring to block 404, the method 400 includes obtaining (e.g., via communications network 106 of FIG. 1), in electronic form, a plurality of data elements. In some embodiments, the plurality of data elements is obtained based on the subject matter association between a candidate subject and each respective data element in the plurality of data elements. In some embodiments, at least a subset of the plurality of data elements is obtained via a language model. By way of example, in some embodiments, the candidate subject is a new video game console, and the plurality of data elements thus relate to video games and/or hardware consoles information. However, the present disclosure is not limited thereto. For instance, in some embodiments, the obtaining the plurality of data elements utilizes a plurality of data gathering mechanisms (e.g., data gathering mechanisms 14 of data gathering mechanism store 12 of FIG. 2A) to obtain the plurality of data elements. As a non-limiting example, in some embodiments, the plurality of data gathering mechanisms 14 includes one or more publication search mechanisms 14 such as a first data gathering mechanism 14-1 that obtains one or more data elements from publications of scholarly literature, such as academic journals or filings with a government entity (e.g., file histories of a patent). In some embodiments, the plurality of data gathering mechanism 14 includes a second data gathering mechanism 14-2 that obtains one or more data elements from an analog signal (e.g., an analog conversion mechanism 14), such as an analog to digital conversion mechanisms 14. Additionally, in some embodiments, the plurality of data gathering mechanisms 14 includes a third data gathering mechanism 14-3 that obtains one or more data elements from a user interface, such as a user interface presented through a display 308 of a client device 300 (e.g., user interface 500-5 of FIG. 5E) or a user interface of a client application 320 hosted on a remote device, such as a user interface of a website. Furthermore, in some embodiments, the plurality of data gathering mechanism 14 include a fourth data gathering mechanism 14-4 that obtains one or more data elements by providing a survey assessment associated with a candidate (e.g., thesis survey of the user interfaces 500 of client application 320 of FIGS. 5A through 5L, or user interface 760 of FIG. 7D). In some embodiments, the survey assessment provided by the fourth data gathering mechanism 14-4 is configured to obtain an accuracy response, an action variable response, an effort response (e.g., a response indicating the candidate subject will save a quantifiable effort of the subject), a speed response, a beneficiary response (e.g., the candidate subject will benefit the user, a friend of the user, a community associated with the user, etc.). As a non-limiting example, in some embodiments the server 200 provides the survey assessment for presentation on the display 308 of the client device 300 and obtains a plurality of data elements from the client device 300 associated with a corresponding plurality of responses provided by a user of the client device 300 responsive to the survey assessment. However, the present disclosure is not limited thereto.

In some embodiments, the candidate subject is a product, product feature, job, job step, or customer need provided by a user of a client device 300. In some embodiments, the candidate subject is a proposed investment provided by a user of a client device 300. For instance, referring briefly to FIG. 6B, a user interface 600 is presented on a client device 300 that allows a user to provide a candidate subject of a proposed new product that gets drivers to a destination on time. However, the present disclosure is not limited thereto. In some embodiments, the candidate subject includes a defined market in a plurality of defined markets. For example, a type of person or customer (e.g., a driver) from various types of people. In this way, each market in the plurality of defined markets includes a corresponding plurality of customers that participate in the market, which defines a universe for a proposed investment candidate subject (e.g., customer and market sizes of FIG. 6B). As a non-limiting example, in some embodiments, the plurality of defined markets include one or more markets associated with a consumer product (e.g., smart phones, electric vehicles, etc.), one or more markets associated with a job, and/or one or more markets associated with a commodity (e.g., wheat, gold, etc.) or a service (e.g., users of ride sharing based client applications 320, a value of owners of a consumer product, etc.). However, the present disclosure is not limited thereto. By way of example, in some embodiments, the candidate subject is a defined market that is provided by a user of a client device (e.g., input through keyboard 310 of client device 300), such as a first candidate subject of a first market of drivers of vehicles, a second candidate subject of a second market of users of a specific operating system, a third candidate subject of a third market of GPS users, a fourth candidate subject of a fourth market of residences in a geographic region, and the like. However, the present disclosure is not limited thereto. In some embodiments, the candidate subject is a proposed product (e.g., corresponding to user interface 700 of FIG. 7A), such as a proposed client application 320 for a client device 300, a proposed product or industry (e.g., an electric propulsion alternative to solid state rocket fuels), a biologic, a pharmaceutical, a mechanical device, an electrical device, a food product, an advertising campaign, to name a few examples. One of skill in the art of the present disclosure will appreciate that the wide variety of candidate subjects are within the domain of the present invention.

In some embodiments, the plurality of data elements that is obtained by the plurality of data gathering mechanisms 14 includes a first set of data elements provided by a first user (e.g., provided through user interface 500-4 of FIG. 5D). In such embodiments, the first user is a respective user of a first client device 300-1. In some embodiments, the first client device 300-1 is different than a second client device 300-2 that is associated with requesting a determination of a product roadmap investment decision and risk assessment. However, the present disclosure is not limited thereto. Moreover, in some embodiments, the plurality of data elements that is obtained by the plurality of data gathering mechanisms 14 includes a second set of data elements derived from a plurality of information sources (e.g., published materials, databases, and/or embeddings in a model.). Accordingly, by utilizing a plurality of data elements that includes both the first set of user-provided information and the second set of data elements from the plurality of information sources, the plurality of data gathering mechanisms 14 provides a robust collection of data elements that is tailored to a candidate subject based on the first set of data elements provided by the first user and the plurality of information sources. In some embodiments, the first set of data elements includes one or more customer behavior information values (customer tendencies, customer trends, etc.), a plurality of online search history and information (e.g., previous search queries, search preferences, etc.), a plurality of customer purchase information (e.g., invoices, product or service reviews, etc.), a plurality of customer calls audio files (e.g., customer-to-business calls, business-to-business calls, etc.), a plurality of product usage information (e.g., user history of a client application 320, historical user-base information, etc.) a plurality of usability testing and tracking information (e.g., private alpha testing tracking and information, public beta testing tracking and information, etc.), a plurality of customer feedback information, a plurality of support tickets, or any combination thereof. However, one of skill in the art will appreciate that the present disclosure is not limited thereto.

In some embodiments, the plurality of information sources includes one or more publication sources, such as one or more books, one or more news media, one or more scholarly articles. However, the present disclosure is not limited thereto. For instance, in some embodiments, the one or more one or more publication sources include one or more social media platforms or client application platforms, such as publically available product reviews, public social media conversations, and the like, which is, optionally, obtained in conjunction with an application programing interface or the like.

In some embodiments, the one or more publication sources includes one or more public and/or private blockchains. Additional details and information regarding the obtaining of data elements from blockchain sources can be found at Brunner et al., 2019, "SPROOF: A Platform for Issuing and Verifying Documents in a Public Blockchain," ICISSP, pg. 15; Hu et al., 2018, "Blockchain-based Smart Contracts-applications and Challenges," arXiv preprint arXiv:1810.04699, each of which is hereby incorporated by reference in its entirety.

In some embodiments, the plurality of information sources includes one or more private sources, such as one or more user created data elements provided by a user of a client device 300. In some embodiments, the private sources include offline document (e.g., inaccessible through communications network 106, such as a cold storage). Other non-limiting examples of a respective information source in the plurality of information sources includes online pages and documents, audio, video, customer behavior information, online searches, customer purchases, customer calls, product usage, usability testing and tracking information, customer feedback information, support tickets, technology-triggered events within a product, or a combination thereof, are stored in the database.

Block 406. Referring to block 406, the method 400 includes forming, based on a subset of the plurality of data elements, a taxonomy of data (e.g., second taxonomy of data 24-2 of FIG. 2B) using a plurality of classification models 20. The plurality of classification models 20 classify the plurality of data elements into a plurality of classifications (e.g., first classification 26-1 of FIG. 2B, classification A 26-A of FIG. 2B, etc.), which allow for creating a data structure from the plurality of data elements and, optionally, having a uniform formatting within the data structure. Moreover, in some embodiments, the plurality of classifications 26 is formed based on an aspect of the candidate subject. As such, each respective taxonomy of data 24 provides a data structure with the plurality of classifications 26 for the plurality of data elements that is obtained by the plurality of data gathering mechanisms 14. Moreover, by forming a respective taxonomy of data 24 based on the subset of the plurality of data elements, a portion of the plurality of data elements obtained by the plurality of data gathering mechanisms 14 is excluded from the taxonomy of data 24, such as one or more data elements that is considered not relevant to the candidate subject (e.g., data elements describing water-bearing propeller costs when the candidate subject is aircraft propeller). By way of example, in some embodiments, each data element in the subset of data elements satisfies a threshold relevancy criterion determined by at least one classification model 20 in the plurality of classification models 20. In this way, in some embodiments, the subset of the plurality of data elements includes less than all of the plurality of data elements should at least one data element in the plurality of data elements fail to satisfy the threshold relevancy criterion. This improves processing efficiency as discussed above. However, the present disclosure is not limited thereto. In alternative embodiments, the subset of the plurality of data elements includes the entire plurality of data elements gathered by the plurality of data gathering mechanism 14.

Additionally, in some embodiments, the taxonomy of data 24 includes at least one data element from the first set of data elements provided by a user of a client device 300 and at least one data element from the second set of data elements that is derived, or obtained from, a respective information source in the plurality of information sources. As a non-limiting example, consider a plurality of data elements that is obtained including a first set of data elements from an accounting spreadsheet created locally by a user on a client device and obtained from the client device 300 over a communications network 106, and a second set of data elements associated with the user that is obtained from a public social media web application. In this way, in some embodiments, the forming the taxonomy of data 24 includes translating, via at least one classification model 20 in the plurality of classification models 20, the plurality of data elements from a native format into a predetermined structured format.

The taxonomy of data 24 includes a plurality of classifications 26 that is determined by the plurality of classification models 20. For instance, in some embodiments, the plurality of classification models 20 include one or more sorting classification models 20 that sort a respective data element in the plurality of data elements obtained from the plurality of data gathering mechanisms 14 into one or more classification 26 in the plurality of classifications 26 of the taxonomy of data 24. Moreover, in some embodiments, the plurality of classifications 26 is generated in response to a candidate subject provided by a user.

In some embodiments, a respective classification 26 in the plurality of classifications 26 is associated with a plurality of customer goals and is defined as a decision goal (e.g., enable a respective customer to select from one or more predetermined selections), an optimization goal (e.g., optimize a route of travel goal), a process goal (e.g., reduce number of steps in a process), or the like. In some embodiments, the respective classification 26 is associated with a plurality of customers referring to a number of customers in a corresponding market classification 26 (e.g., as subjects involved in a customer goal classification 26). In this way, in some embodiments, content of a first classification 26-1 can overlap with content of a second classification 26-1, such as the first classification 26-1 is associated with data elements describing various consumer markets (e.g., motorcycle drivers, smart device users, etc.) and the second classification 26-2 is associated with data elements describing various customer goals (e.g., goals of how users interact with mechanical user interfaces, goals of how users interact with touch-display user interfaces, etc.). Furthermore, in some embodiments, the respective classification 26 is associated with a plurality of beneficiaries that distinguishes a plurality of beneficiary customers in the market. In some embodiments, the plurality of beneficiary customers in the market is defined as subjects benefitting from achieving the customer goal classification 26. Additionally, in some embodiments, the respective classification 26 is associated with a plurality of executors that distinguishes executor customers in the market. In some embodiments, the executor customers in the market are defined as a number of subjects currently involved in processes or technologies (e.g., competitor solutions of FIG. 5G, competitor solutions of FIG. 6C, etc.) used to achieve the customer goal classification 26. Finally, in some embodiments, the respective classification 26 is associated with purchase decision makers that distinguish purchase decision makers in the market. In some embodiments, the purchase decision makers in the market are defined as subjects influencing the decision to purchase solutions to achieve the customer goal. However, the present disclosure is not limited thereto. One of skill in the art will appreciate that the above-described classifications 26 are not limited to distinguishing aspects in a market but can also be applied to distinguishing aspects of a candidate subject.

In some embodiments, at least one classification 26 in the plurality of classifications 26 includes a corresponding plurality of variables 28 that form a basis for determining a product roadmap investment decision and risk assessment. For instance, in some embodiments, a respective classification 26 includes a plurality of input variables 28 in the plurality of variables 28 in which each respective input variable 28 in the plurality of input variables 28 is associated with a variation in the respective classification 26. By way of example, consider a first classification 26-1 that describes a willingness to pay for a candidate subject, such that a first input variable 28-1 in a plurality of input variables 28 associated with the first classification 26-1 describes a range of a willingness to pay from five dollars to eight dollars based on a plurality of data elements obtained from one or more data gathering mechanism 14 (e.g., survey data gathering mechanism 14). However, the present disclosure is not limited thereto. In some embodiments, the variation is configured without human intervention (e.g., by server 200 of FIGS. 2A and 2B). In some embodiments, a respective variable 28 in the plurality of variables 28 associated with a corresponding classification 26 is a function of a second variable 28-2 in the plurality of variables 28 that is also associated with the corresponding classification 26 (e.g., a willingness to pay variable 28-1 is a function of a pricing variable 28-1 that are both associated with a corresponding customer segment classification 26). In some embodiments, the method 400 obtains, or retrieves (e.g., from memory 192 of FIG. 2A) the plurality of data elements gathered by the plurality of data gathering mechanisms 14. For instance, in some embodiments, a first classification 26-1 of a respective market includes a first plurality of input variables 28 and structured data within a respective taxonomy of data 24. In some embodiments, the plurality of input variables 28 associated with a respective classification 26 includes a first variable number of customers 28-1, a second variable number of beneficiaries 28-2, a third variable number of executors 28-3, a fourth variable number of purchase decision makers 28-4, a fifth variable number of a plurality of customer goals 28-5, a sixth variable number of a plurality of customer steps 28-6, a seventh variable number of plurality of customer needs 28-7, a ninth variable value of a willingness to pay 28-9, or a combination thereof. In some embodiments, the plurality of customer goals forms a second classification 26-2 that includes a second plurality of input variables 28 and structured data within the respective taxonomy of data 24 independent of solutions in the first classification 26-1 of the market. However, the present disclosure is not limited thereto.

In some embodiments, for each respective classification 26, the plurality of variables 28 includes one or more control variables 28, which define one or more static variables 28 or user provided variables 28 that cannot be changed by the server 200 when determining and/or evaluating if a respective output in a range of outputs satisfies each threshold criterion in a plurality of threshold criteria. For instance, in some embodiments, the plurality of variables 28 includes a first a speed variable 28-1 that is defined quantitatively, such as milliseconds, seconds, minutes, hours, days, etc. Referring briefly to FIG. 5J, as a non-limiting example, a first speed variable 28-1 is defined as "1 seconds" for a period of time to provide a realization of a candidate subject, such as an estimate of time to satisfy a need of a candidate subject. In some embodiments, for each respective classification 26, the plurality of variables 28 includes a second accuracy variable 28-2 that is defined quantitatively, such as a percentage from 0 percent to 100 percent or as a relative value (e.g., high, medium, low). Referring briefly to FIG. 5J, as a non-limiting example, the second accuracy variable 28-2 is defined as "98%." In some embodiments, for each respective classification 26, the plurality of variables 28 includes a third level of effort variable 28-3 that is defined quantitatively (e.g., as a percentage from zero to 100 percent, or high, medium, low, etc.). In some embodiments, the third level of effort variable 28-3 is defined as a percentage of a plurality of survey respondents based on a survey data gathering mechanism 14, such as a first percentage of the plurality of survey respondents that provided a predetermined answer (e.g., Yes or No to a survey prompt). In some embodiments, for each respective classification 26, the plurality of variables 28 includes a fourth perception of effort variable 28-4 that is defined quantitatively, similarly to the third level of effort variable 28-3 (e.g., as a percentage from 0 percent to 100 percent; high, medium, low; a percentage of survey respondents based on a survey data gathering mechanism 14, etc.). In some embodiments, for each respective classification 26, the plurality of variables 28 includes a fifth perception of emotion variable 28-5 that is defined quantitatively (e.g., as a percentage from 0 percent to 100 percent; high, medium, low; a percentage of survey respondents based on a survey data gathering mechanism 14, etc.

In some embodiments, the plurality of classifications 26 includes a first markets classification 26-1, a second customer goals classification 26-2, a third customers classification 26-3, a fourth beneficiary classification 26-4, a fifth executors classification 26-5, and a sixth purchase decision makers classification 26-6. Accordingly, each respective classification 26 in this plurality of classification 26 includes a corresponding customer steps variable 28 that is a function of one or more variables 28 of the second customer goals classification 26-2. For instance, in some embodiments, the corresponding customer steps variable 28 is defined as a process of steps a customer has to go through to achieve the goal (e.g., user interface 500-3 of FIGS. 5C, user interface 500-4 of FIGS. 5D, user interface 500-5 of FIG. 5E, user interface 600-2 of FIG. 6B, etc.). In some embodiments, for each respective set of markets, there are a plurality of corresponding customer needs with discrete structured data and is defined as customer needs can be defined as customer actions and variables 28 related to the corresponding customer steps variable 28 and the second customer goals classification 26-2.

Block 408. Referring to block 408, the method 400 includes determining, based on the forming, a respective output from a range of outputs in accordance with a selection of a set of variables 28.

In some embodiments, the respective output includes a willingness to pay for a candidate subject. In some embodiments, the respective output includes a customer segment, such as a range of customers within a market classification 26. In some embodiments, the respective output includes a customer value, such as a pricing for the candidate subject. In some embodiments, the respective output includes an assessment of a risk, such as a risk assessment and/or a technology risk assessment. Elliot et al., 2019. In some embodiments, the respective output includes a financial investment, such as a total estimated cost to provide a realization of a candidate subject. In some embodiments, the respective output includes a probability of success of providing the realization of the candidate subject. In some embodiments, the respective output includes a revenue growth, such as an estimate of revenue growth given a respective customer segment. In some embodiments, the respective output includes a return on investment, such as an estimate of profits when providing the realization of the candidate subject.

In some embodiments, the selection of the respective set of variables 28 includes a first set of input variables 28 from the corresponding plurality of variables 28 for the at least one classification 26. In some embodiments, the respective selection of the respective set of variables 28 includes a second set of control variables 28 that is associated with the candidate subject. In some embodiments, each respective control variable is defined by a user of a client device and is static, in that the method 400 cannot change a respective control variable without authorization or input from the user. However, the present disclosure is not limited. In some embodiments, each respective input variable 28 is configured by a user of a client device 300. For instance, in some embodiments, the user of the client device 300 configures a value or a range of values of a respective input variable 28, such as a percentage of an accuracy variable 28. In some embodiments, each respective input variable 28 is configurable by the server 200, such as reconfiguring the range of values configured by the user or selecting a specific value within the range of values.

In some embodiments, the respective output is defined using one or more variables from either a first customer needs classification 26-1 or a second customer steps classification 26-2, such as if the respective output is one or more customer segments. In some embodiments, one or more variables 28 utilized in determining the one or more customer segments for either the first customer needs classification 26-1 or the second customer steps classification 26-2 includes the speed variable 28, the accuracy variable 28, the level of effort variable 28, the perception of effort variable 28, and/or the perception of emotion variable, or a combination thereof. For example, consider a survey data gathering mechanism 14 that provides a survey to a respective user (e.g., communicated to client device 300), in which the survey includes one or more prompts related to a plurality of customer needs, such that the survey obtains a plurality of data elements associated with a customer needs classification 26. Accordingly, in some embodiments, the respective customer provides, via the user interface 306 of the client device 300, one or more customer effort scores in response to the one or more prompts of the data gathering mechanism 14, and the one or more customer effort scores is obtained by the server 200. Accordingly, in some embodiments, a respective output of one or more customer segments is determined based on the evaluation the respective output against a plurality of threshold criteria. Here, the plurality of threshold criteria a first threshold criterion associated with the customer effort score of the candidate subject and a second threshold criterion associated with a plurality of statistical models 32.

In some embodiments, the respective set of variables 28 includes a first variable 28-1 defined by a user and a second variable 28-2 defined without human intervention, such as by one or more classification models 20 and/or one or more statistical models 32. For instance, in some embodiments, a first user that provides the candidate subject defines a first variable 28-1 of a revenue growth (e.g., 325% quarterly growth for first three years of product launch), and, in response to the defining of the first variable 28-1, a second variable 28-2 of a customer effort is defined by one or more classification models 20 and/or one or more statistical models 32.

In some embodiments the first set of input variables 28 includes a first input variable 28-1 of a respective description of customers, such as description of one or more customers that define a market classification 26. In some embodiments, the first set of input variables 28 includes a second input variable 28-2 of a respective description of beneficiaries, such as description of one or more beneficiaries of a candidate subject within the market classification 26. In some embodiments, the first set of input variables 28 includes a third input variable 28-3 of a respective description of executors. In some embodiments, the first set of input variables 28 includes a fourth input variable 28-4 of a respective description of purchase decision makers within the market classification 26. In some embodiments, the first set of input variables 28 includes a fifth input variable 28-5 of a respective description of customer goals for the market classification 26. In some embodiments, the first set of input variables 28 includes a sixth input variable 28-6 of a respective description of customer steps to provide a realization of a candidate subject within the market classification 26. In some embodiments, the first set of input variables 28 includes a seventh input variable 28-7 of a respective description of customer needs within the market classification 26.

In some embodiments, the forming the taxonomy of data 24 further includes storing the taxonomy of data 24. In some embodiments, the taxonomy of data 24 is stored at a server (e.g., server 200 of FIGS. 2A and 2B), at a client device (e.g., client device 300 of FIG. 1), or a combination thereof.

In some embodiments, the plurality of threshold criteria includes a first threshold criteria associated with a threshold variance in the selection of the respective set of variables 28. For instance, in some embodiments, the threshold variance is a minimum deviation between a selection of a first variable 28-1 and a selection of a second variable 28-2. By requiring that the plurality of threshold criteria includes the threshold variance, a determination of a product roadmap investment decision and risk assessment provided by the method 400 is robust and not narrowly tailored. However, the present disclosure is not limited thereto.

Block 410. Referring to block 410, the method 400 includes evaluating the respective output against a plurality of threshold criteria. The plurality of threshold criteria includes a first threshold criterion associated with the candidate subject and a second threshold criterion associated with a plurality of statistical models (e.g., statistical models 32 of FIG. 2B). In some embodiments, a respective statistical model includes 10 or more parameters, 20 or more parameters, 30 or more parameters, 40 or more parameters, 50 or more parameters, 100 or more parameters, 200 or more parameters, 400 or more parameters, or 1000 or more parameters that each contribute to determining and/or evaluating a respective output in accordance with the respective statistical model. In some embodiments, an example of "parameters" of a statistical model 32 includes a plurality of weights and/or a plurality of coefficients used by the statistical model 32.

In some embodiments, the respective output includes one or more customer segments. The one or more customer segments of the respective output is defined quantitatively and also determined using one or more statistical models 32 in the plurality of statistical models 32. In some embodiments, the one or more statistical models 32 utilized includes a first factoring statistical model 32-1 (e.g., a factor analysis statistical model 32). Additional details and information regarding factoring statistical models 32 are described in Harman, Harry H., 1976, "Modern factor analysis," University of Chicago press, print, and Child, Dennis, 1990, "The essentials of factor analysis," Cassell Education, print, each of which is hereby incorporated by reference in their entirety. In some embodiments, the one or more statistical models 32 utilized includes a second clustering statistical model 32-2 (e.g., a hierarchical clustering statistical model 32). Additional details and information regarding clustering statistical models 32 is described in Johnson, Stephen C., 1967, "Hierarchical clustering schemes," Psychometrika, 32(3), pg. 241, which is hereby incorporated by reference in its entirety. In some embodiments, the one or more statistical models 32 utilized includes a third kurtosis statistical model 32-3. Additional details and information regarding kurtosis statistical models 32 are described in DeCarlo, Lawrence T., 1997, "On the meaning and use of kurtosis," Psychological methods, 2(3), pg. 292, and Mardia, Kanti V., 1970, Measures of multivariate skewness and kurtosis with applications," Biometrika, 57(3), pg. 519, each of which is hereby incorporated by reference in their entirety.

In some embodiments, the respective output of the one or more customer segments is defined using either a selection of a set of variables 28 from the customer needs classification 26 or the customer steps classification 26. In some embodiments, one or more variables 28 utilized in determining the one or more customer segments of the respective output for either the customer needs or the customer steps includes the speed variable 28, the accuracy variable 28, the level of effort variable 28, the perception of effort variable 28, the perception of emotion variable 28, or a combination thereof. For example, consider a data gathering mechanism 14 that provides a survey assessment to a respective customer 102 (e.g., communicated to client device 300 associated with the respective customer), in which the server 200 obtains a plurality of data elements including one or more responses to one or more prompts related to a plurality of customer needs. Accordingly, the plurality of data elements is classified by a plurality of classification models 20 into at least a customer needs classification 26. Accordingly, a respective output of one or more customer segments is determined based on utilizing one or more statistical models and the customer effort classification 26.

Accordingly, the method 400 determines and evaluates if the respective output of the customer segment, using a first selection of a first set of variables 28 in the plurality of variables 28, satisfies a plurality of threshold criteria (e.g., a first threshold criterion in the plurality of threshold criteria that indicates enough variation from the non-segmented customers, the beneficiaries, or the executors). In some embodiments, if the method 400 determines the first threshold criterion is not satisfied by the first selection of the first set of variables 28, a second selection of a set of variables 28 including one or more input variables 28 for a first categorization 26-1 of customer needs and one or more input variables 28 for a second classification 26-2 of customer steps are used (e.g., from within the customer goals) to determine if the plurality of threshold criteria is satisfied using the second selection of the respective set of variables 28 including the one or more input variables 28 for the first categorization 26-1 of customer needs and the one or more input variables 28 for the second classification 26-2 of customer steps that would meet the first threshold criterion for variation. In some embodiments, once the first threshold criterion is satisfied, the method 400 proceeds to use the selected set of customer needs and/or customer steps that satisfied the first threshold criterion for further evaluations (e.g., reiterative evaluations of block 410 of FIG. 4).

Block 412. Referring to block 412, the method 400 includes determining if the respective output satisfies each threshold criterion in the plurality of threshold criteria. By way of example, in some embodiments, the system 100 determines and evaluates if the respective set of variables selected (e.g., a control variable from a market classification 26 and a first set of input variables from a customer segment classification 26) satisfies the plurality of threshold criteria for a product roadmap investment decision. If the method 400 determines that the plurality of threshold criteria is not satisfied by the respective output, and thus the selection of the respective set of variables, a selection of a second set of variables is provided (e.g., a second selection of a willingness to pay data is used for a further customer segment) to be analyzed. In some embodiments, this reiterative selection of a respective set of variables is repeated until the plurality of threshold criteria is satisfied. In some embodiments, this reiterative selection of a respective set of variables is repeated one, two, three, four, five, six, 10, 100, 1000, or 10,000 times before the plurality of threshold criteria is satisfied. In some embodiments, in accordance with a determination that the plurality of threshold criteria is satisfied, the method 400 proceeds to use the respective output (e.g., the willingness to pay with the corresponding customer segment) for further evaluations and calculations using the plurality of statistical models 32. For example, consider a customer using a client device 300 of the system 100 to determine a product roadmap investment decision for a candidate subject of a product that assists other users to arrive at a destination on time with at least five-million dollars in revenue (e.g., a respective threshold criterion in the plurality of threshold criteria). However, consider that the respective output of the determined willingness to pay is below the five-million dollars threshold criterion. Accordingly, the method 400 reiterates evaluating if a selection of a second set of variables (e.g., the control variable 28 from the market classification 26 and a second set of input variables 28 from the customer segment classification 26) satisfies the five-million dollars threshold criterion.

In some embodiments, with the selection of a set of variables 28 from the customer segment classification 26 and the willingness to pay classification 26, a respective output including a customer value is evaluated by determining a pricing that would optimize a respective candidate subject (e.g., investment in a product). In some embodiments, the respective output of the pricing is determined using one or more statistical models 32 in the plurality of statistical models 32, such as an optimization statistical based on the respective set of variables of the willingness to pay for the customer segment. In some embodiments, the statistical optimization utilized by a respective statistical model 32 in determining a pricing includes a Pareto efficiency optimization, which occurs when a state of equilibrium is achieved between a plurality of competitive groups (e.g., a first group cannot be improved without worsening a second group), such as a production possibility frontier. Additional details and information regarding Pareto efficiency is described in Pettinger, Tejvan, "Pareto efficiency, Economics Help, online, accessed Mar. 31, 2020 (economicshelp.org/blog/glossary/pareto-efficiency), which is hereby incorporated by reference in its entirety.

In some embodiments, the respective output includes a customer value from a range of customer values. In some embodiments, the customer value is determined using an input variable of an assessment of technology risk that is defined quantitatively (e.g., as a percentage from zero, unknown, to 100%, known with perfect certainty, etc.). For example, consider an unmet customer need classification, such as a need to determine an optimal number of stops when travelling to a destination. Accordingly, the system 100 determines if there is one or more known solutions and/or one or more known customers attempting a solution (e.g., gathering a plurality of data elements via a plurality of data gathering mechanisms 14, classifying the plurality of data elements, etc.) than a corresponding assessment of technology risk is low. However, if no known solutions and/or known customers exists, then the corresponding assessment of technology risk is high. Furthermore, in some embodiments, a customer value is determined using an input variable of a dollar investment required for a realizing a respective product roadmap of a candidate subject. In some embodiments, the dollar investment is provided by a respective customer as an input to the system 100 via a client device (e.g., in response to a survey assessment provided to the customer). Moreover, in some embodiments, the dollar investment describes a quantitative estimation of a product roadmap investment, such as a number of story points in agile, or dollars per hour and a total number of hours needed for product development. Additional details and information regarding story points in agile is described in Coelho et al., 2012, "Effort estimation in agile software development using story points," International Journal of Applied Information Systems, 3(7), print, which is hereby incorporated by reference in its entirety. Additionally, in some embodiments, the respective output includes a probability of success. The probability of success is determined using a change from an initial value of one or more input and/or control variables for a first classification of customer needs 26-1 or a second classification of customer steps 26-2 (e.g., speed, accuracy, level of effort, perception of effort, perception of emotion) and a new value of the one or more variables based on a new feature idea in the product roadmap. In some embodiments, the probability of success is based on a determination of unmet customer needs and a value added for a customer segment in addition to a technology risk. In some embodiments, a user defines one or more of the above-described variables as an input to the system 100.

In some embodiments, the respective output includes how much revenue growth will likely be generated. Accordingly, in some embodiments, the plurality of threshold criteria includes a respective threshold criterion of a threshold revenue growth. If the respective threshold criterion is not satisfied, the method 400 reevaluates the above describe determinations (e.g., block 408 of FIG. 4, block 412 of FIG. 4) using a different set of input variables that includes a different pricing optimization. In some embodiments, if the respective threshold is not satisfied, the method 400 reiterates conducting the above describe determinations (e.g., block 408 of FIG. 4, block 412 of FIG. 4) using a control variable (e.g., a different classification 26 of market or a customer segment) with a different set of input variables (e.g., a different classification 26 of willingness to pay. For example, consider a user using a client device 300 of the system 100 to determine a product roadmap investment decision and risk assessment for a candidate subject that is new product (e.g., investment) for determining an optimal sequence of stops when travelling to a destination. The system 100 determines (e.g., through one or more customer respondents to a survey) that the new product candidate subject will change a customer effort score from 85% to 15% (e.g., high difficulty to low difficulty). Accordingly, method 400 determines that approximately 40% of a market share will be needed in order to satisfy a desired revenue growth threshold criterion.

In some embodiments, the respective output includes a messaging resonance that is defined quantitatively. In some embodiments, the messaging resonance is defined as a percentage from zero percent to one hundred percent of customer respondents to a survey (e.g., a survey provided by the server 200). By way of example, in some embodiments, the percentage of the messaging resonance is an estimate of customers estimated to purchase and/or express interest in a candidate subject.

In some embodiments, the respective output includes a competitive position that is defined quantitatively. In some embodiments, the competitive position is defined as a difference between a first customer value created by a candidate subject and a second customer value created by competitor products. In some embodiments, this second customer value is obtained by the plurality of data gathering mechanisms 14 and stored in a respective taxonomy of data 24, whereas the first customer value is provided by a user of the system 100 as an input variable.

In some embodiments, the respective output includes a market position that is defined quantitatively. In some embodiments, the market position is defined as a sum of a difference between the first customer value and the second customer value created by competitor products for each respective customer step and each respective customer need in the target customer segment of the respective output.

Moreover, in some embodiments, the respective output includes a revenue growth and the respective set of variables selected in accordance with the respective output includes a market resonance, a competitive position, a market position or a combination thereof. For instance, consider a user of a client device 300 of the system 100 determining a product roadmap investment decision and risk assessment for a candidate subject that is new product (e.g., investment) for determining an optimal sequence of stops when travelling to a destination. A first message of "get there faster" and a second message of "your day and stops, optimized" are evaluated to determine a respective output that includes a first revenue growth associated with the first message and a second revenue growth associated with the second message. Accordingly, the method 400 determines (e.g., through evaluating one or more data elements associated with respondents to a survey with a plurality of statistical models 32) that the second message has a higher respective message resonance than the first message. Accordingly, the method 400 determines that the second message will likely result in a respective higher revenue growth than the first message.

In some embodiments, once the revenue growth has met one or more revenue threshold criteria in the plurality of threshold criteria (e.g., a fourth threshold criterion), the method 400 determines a respective output of a return on investment, such as by using the revenue and the product roadmap investment. Furthermore, in some embodiments, the method 400 determines as a respective output a risk assessment using the customer value and the technology risk. If the return on investment does not satisfy a threshold value criterion in the plurality of threshold criterion, a fifth decision engine will begin conducting the above-described determinations (e.g., block 408 of FIG. 4, block 412 of FIG. 4) using a selection of a second set of variables including one or more markets variables and one or more customer goals variables.

Block 414. Referring to block 414, the method 400 includes providing, in electronic form, based on the determining if the respective output satisfies each threshold criterion (e.g., if a respective threshold criterion in the plurality of threshold criteria that requires at least five-million dollars in revenue), a product investment decision and risk assessment for the candidate subject in accordance with the satisfaction of each threshold criterion in the plurality of threshold criteria. For instance, in some embodiments, the providing the product investment decision and risk assessment includes communicating a report, in electronic form, from the server 200 to a respective client device 300. In some embodiments, the providing the product investment decision and risk assessment includes configuring a user interface.

Referring to FIGS. 5A through 5M and FIGS. 6A through 6E, example user interfaces are depicted that allow a customer to determine a product roadmap investment decisions and risk assessment through a client device 300. In some embodiments, the systems and methods of the present disclosure to create a product roadmap investment profile and a risk assessment profile for a user. In some embodiments, the user accesses the product roadmap investment profile and the risk assessment profile though a display of a client device (e.g., a software interface of a client application presented through the display of the client device). In some embodiments, based on the product roadmap investment profile and the risk assessment profile, a user creates a feature thesis for the product roadmap and can gain agreement with one or more users on the priority, timing, level of investment, risk, and value of the feature in the product roadmap, or a combination thereof. In some embodiments, an input provided by a user regarding the product roadmap investment profile and/or the risk assessment profile is used for further improvement in determining product roadmap investment decisions and risk assessment.

Figure 7A:
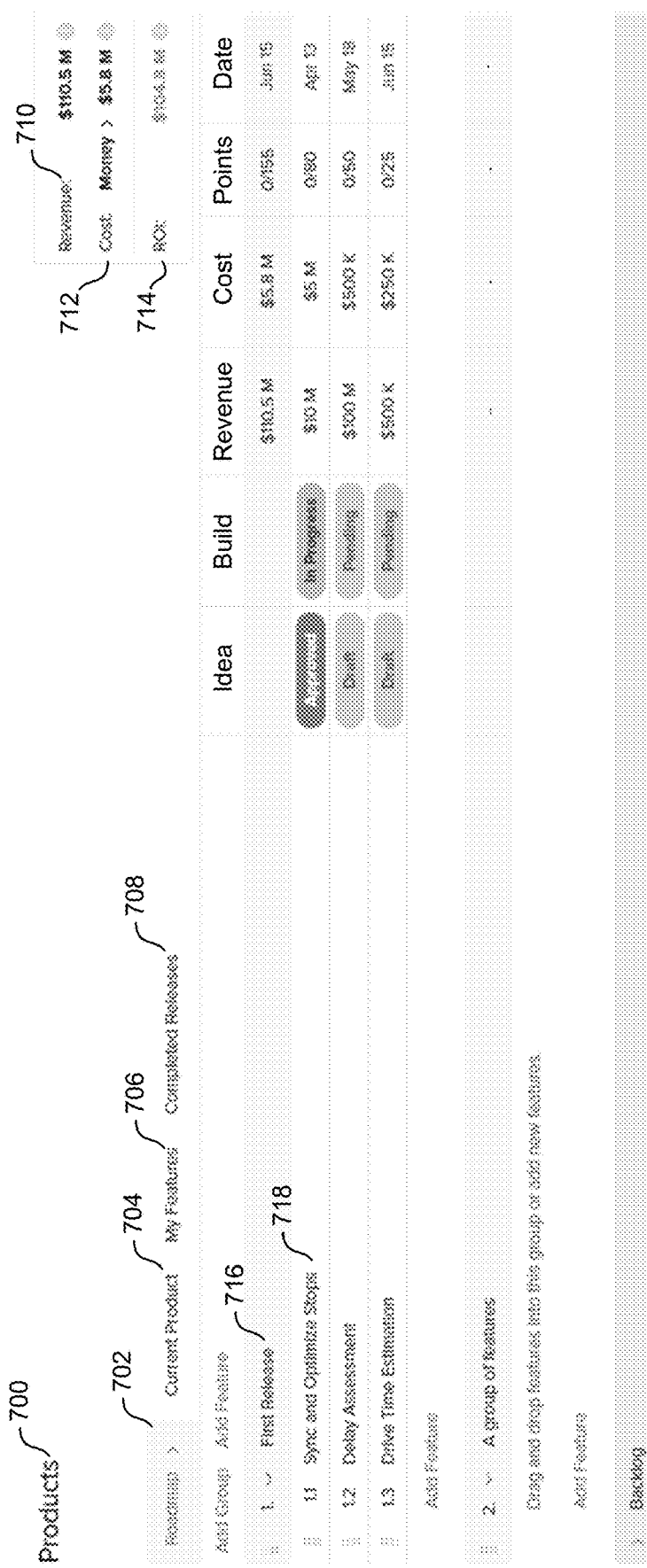

FIG. 7A illustrates an example user interface for product features in accordance with some embodiments. The user interface 700 in FIG. 7A includes a roadmap element 702, a current product element 704, a features element 706, and a completed releases element 708. In some embodiments, each element corresponds to a different user interface (e.g., a different tab or page). In the Example of FIG. 7A, the roadmap element 702 is selected and the user interface 700 includes a group of features 716, denoted "First Release." The group of features 716 includes the feature 718, denoted "Sync and Optimize Stops" as well as a feature denoted "Delay Assessment" and a feature denoted "Drive Time Estimation." In some embodiments, one or more features or groups of features are received from a user (e.g., via a selection of the "Add Feature" element or "Add Group" element). In some embodiments, one or more features or groups of features are obtained from a language model (e.g., from the language model store 11). The user interface 700 further includes a revenue element 710, a cost element 712, and a return on investment (ROI) element 714. In some embodiments, the revenue element 710 represents an estimate of revenue the features will generate based on testing what customers are willing to pay if the feature helps them get the job done. In some embodiments, the cost element 712 represents a summation of the costs associated with each feature in the groups of features. In some embodiments, at least a portion of the revenue, cost, and/or ROI data is received from a user. In some embodiments, at least a portion of the revenue, cost, and/or ROI data is obtained from a language model.

Figure 7B:

FIG. 7B illustrates an example user interface for researching job steps in accordance with some embodiments. The user interface 720 in FIG. 7B includes a customer element 722, a job element 724, and a plurality of job steps 726 that correspond to the job element 724. In the example of FIG. 7B, the job steps 726 include a job step 728 with a corresponding need 730 and a job step 734. The user interface 720 also includes a needs element 732, which when activated, allows the user to add an additional need to the corresponding job step. In some embodiments, identification of the customer is received from the user. In some embodiments, identification of the customer is obtained from a language model (e.g., by inputting information about the job to be performed). In some embodiments, at least a portion of the job steps 726 are received from the user. In some embodiments, at least a portion of the job steps 726 are obtained from a language model (e.g., by inputting information about the job to be performed).

Figure 7C:
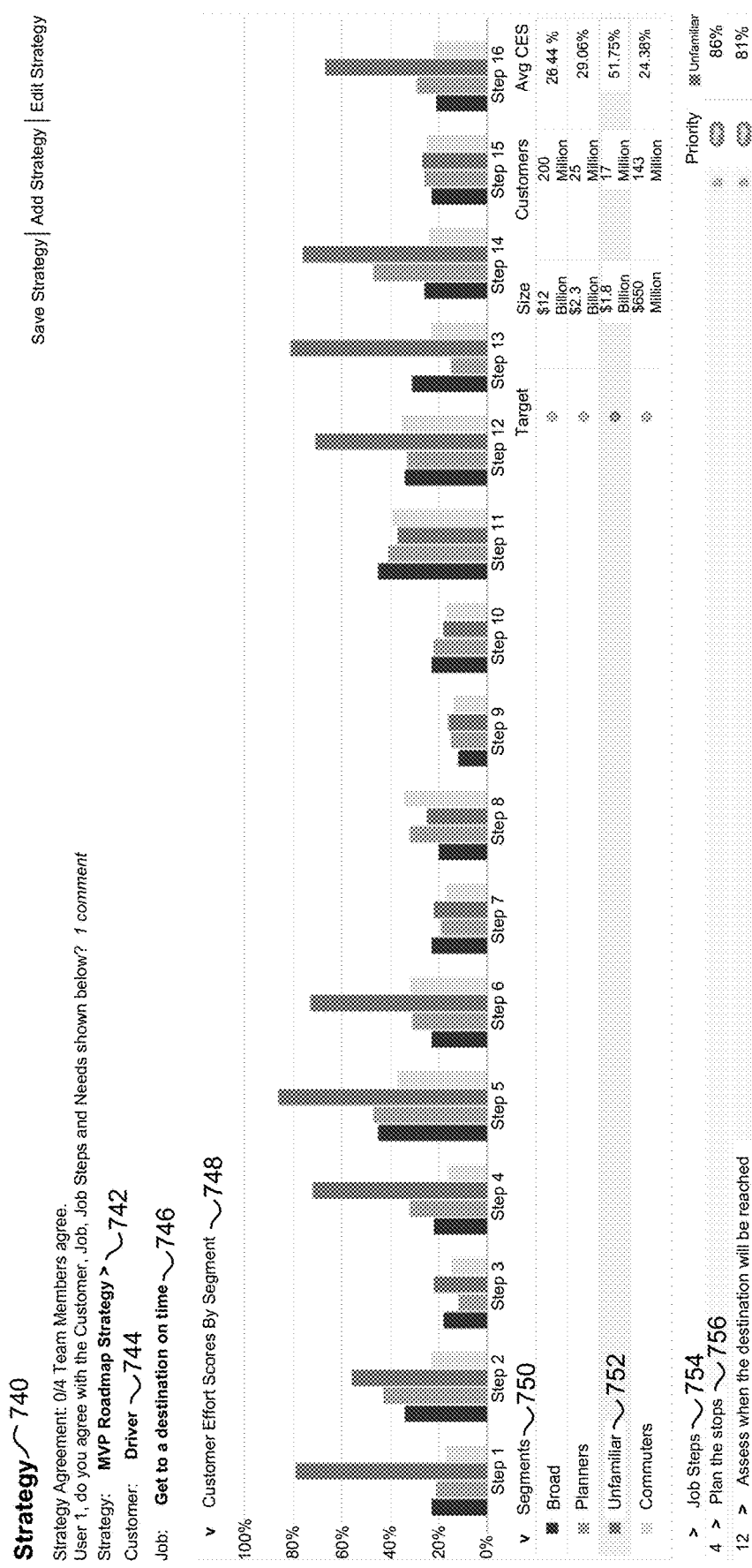

FIG. 7C illustrates an example user interface for product/investment strategy in accordance with some embodiments. The user interface 740 in FIG. 7C includes a strategy element 742 (e.g., corresponding to the product roadmap from FIG. 7A), a customer element 744 (e.g., corresponding to the customer element 722 in FIG. 7B), and a job element 746 (e.g., corresponding to the job element 724 in FIG. 7B). The user interface 740 also includes a graphical display of customer effort scores by segment 748. In some embodiments, at least a subset of the customer effort scores is received from the user (e.g., via the user interface 500-11 in FIG. 5K). In some embodiments, at least a subset of the customer effort scores is determined based on survey feedback (e.g., a survey generated using the user interface 760 in FIG. 7D). In some embodiments, at least a subset of the customer effort scores is obtained from a language model and/or statistical model. The user interface 740 includes a segments section 750, that includes a target segment 752. The target segment 752 in FIG. 7C corresponds to drivers that are unfamiliar with where they are driving. In some embodiments, at least a subset of the customer segments is received from the user. In some embodiments, at least a subset of the customer segments is obtained from a language model (e.g., by inputting information about the job and/or the intended customer). The user interface 740 also includes a job steps section 754 (e.g., corresponding to the job steps 726 in FIG. 7B). The job steps section 754 includes a job step 756 that is ranked the highest (e.g., based on customer effort scores for the target segment 752). In the example of FIG. 7C, the job step 756 has an associated customer effort score of 86% for the target segment 752. In some embodiments, the job steps section 754 includes an option to rank the job steps based on customer effort scores and/or product feature information (e.g., cost, revenue, and/or ROI data).

Figure 7D:
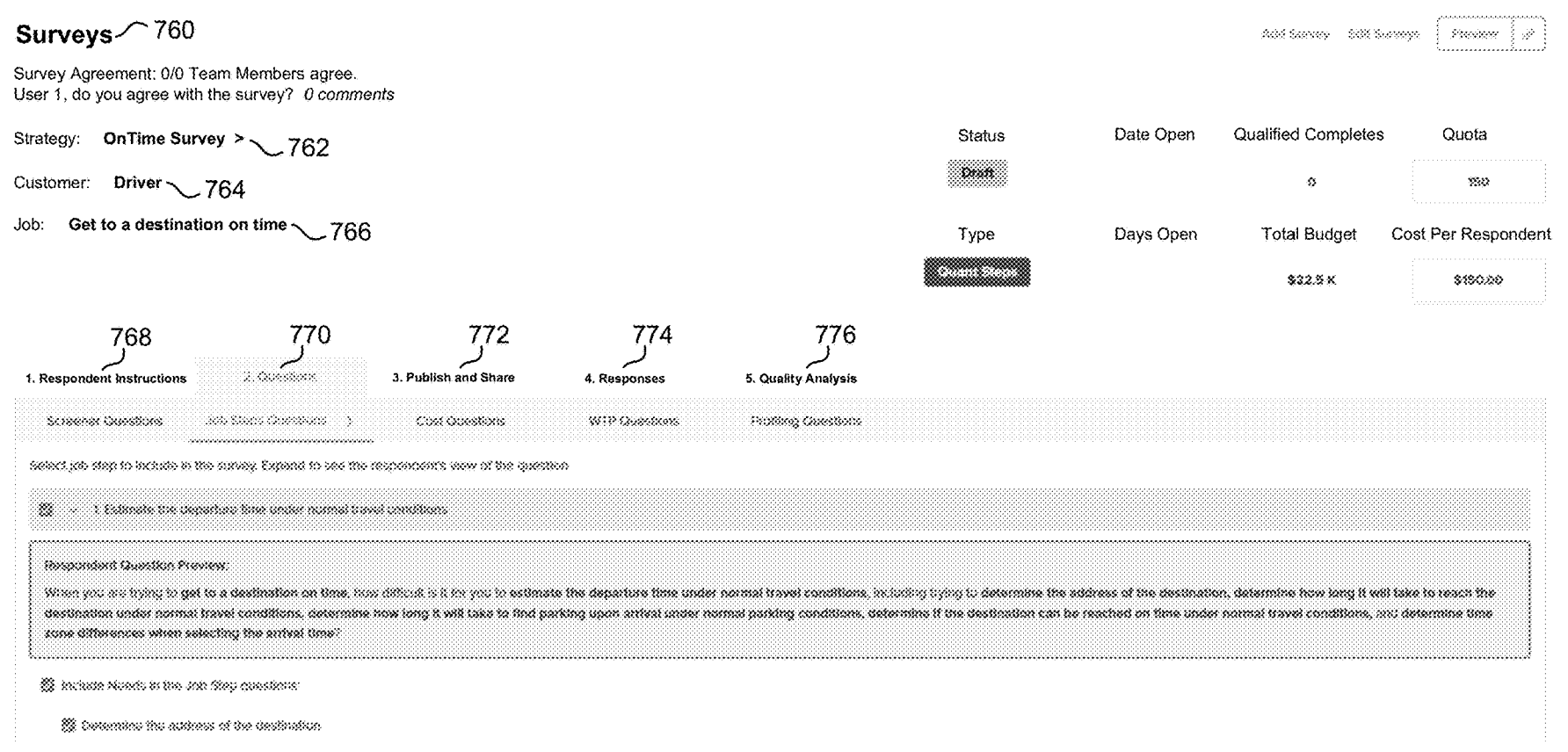

FIG. 7D illustrates an example user interface for surveying in accordance with some embodiments. The user interface 760 in FIG. 7D includes a strategy element 762

(indicating a strategy associated with the survey being generated), a customer element 764 (e.g., corresponding to the customer element 722 in FIG. 7B), and a job element 766 (e.g., corresponding to the job element 724 in FIG. 7B). The user interface 760 further includes a respondent instructions element 768 (that when selected causes display of instructions for the survey along with options to edit, add, and/or remove instructions), a questions element 770 (which is active in the example of FIG. 7D), a publish and share element 772 (that when selected causes display of options for publishing and sharing the survey), a responses element 774 (that when selected causes display of responses to the survey, e.g., arranged by question), and a quality analysis element 776 (that when selected causes display of analytics related to the responses to the survey). The questions section of the user interface 760 includes a screener questions element, a job steps questions element, a cost questions element, a willingness-to-pay (WTP) questions element, and a profiling questions element. Selection of each element allows the user to view, edit, remove, and/or add questions of the corresponding type. In some embodiments, the survey questions are received from the user (e.g., in accordance with prompts, recommendations, and data displayed in the user interface 760). In some embodiments, one or more of the survey questions are generated (e.g., using a language model) based on the strategy, customer, and/or job information. The user interface 760 also includes options to add surveys, edit surveys, and preview surveys as well as budget and timing information for the surveys.

FIG. 8 is a flow diagram illustrating a method 800 of job segmentation in accordance with some embodiments. The method 800 may be performed at a computing system (e.g., the distributed client-server system 100, the server 200, or the client device 300) having control circuitry and memory storing instructions for execution by the control circuitry. In some embodiments, the method 800 is performed by executing instructions stored in the memory (e.g., the memory 192 or 312) of the computing system.

The system receives (802), from a user, identification of a job to be performed (e.g., the job denoted "get to a destination on time" in FIGS. 7B through 7D). In some embodiments, the identification of the job to be performed is a name of the job. In some embodiments, the system determines a growth opportunity and/or a target segment based on the identification of the job to be performed. In some embodiments, the system inputs the identification of the job to a language model and the language model identifies the growth opportunity (e.g., in conjunction with a statistical model) and/or the target segment.

The system obtains (804) a set of job steps corresponding to segmentation of the job to be performed. For example, at least a portion of the job steps are obtained from a user via the user interface 600-2 and/or the user interface 720. In some embodiments, obtaining the set of job steps corresponding to segmentation of the job to be performed includes: (i) providing the identification of the job to be performed and instructions to a language model (e.g., a large language model such as GPT-4); and (ii) in response to providing the identification of the job to be performed, receiving the set of job steps from the language model. In some embodiments, the instructions are provided to the language model in a markdown table. In some embodiments, the system provides a set of example job steps to the language model. In some embodiments, the set of example job steps are provided in as a structured data array. In some embodiments, the system filters out (or flags) job steps that are based on a particular solution (e.g., filters out job steps that rely on a particular product or protocol). In some embodiments, the system identifies a set of variables for the job to be performed (e.g., using a language model). In some embodiments, the system causes the set of variables to be presented to the user (e.g., to assist with identifying job steps for the job). In some embodiments, the system uses the set of variables to identify job steps for the job (or edit previously-identified job steps).

For example, manually identifying job steps is a process that can take months and may include reviewing industry literature, refining current company research, and doing many interviews with employees and current/prospective customers. Integrating AI (such as large language models) into the job step creation process can significantly reduce time spent workshopping and researching (e.g., several minutes instead of several months) and improve accuracy/completeness. As an example, a user inputs the job name into a user interface before generating the job steps. The system may receive examples and guidelines from a database (e.g., the data gathering mechanism store or the taxonomy store 22) that may be written into the prompt that is provided to the language model. In some embodiments, the language guidelines are input as markdown table and the example job steps are input as a json array. Transformers and language models excel at digesting information from both of these formats. Once a prompt/instructions are set, the prompt can be static for subsequent jobs with the exception of the job name passed in by the user. For example, the system assigns the job steps to the job in a list with an indication that the data came from AI. Furthering the example, when a user approves and/or edits the data it is indicated in the interface. The approved job steps may then become the cornerstone of users' organization of customer insights, strategy decisions, current product analysis, and roadmap analysis, all conducted in the application.

In some embodiments, the system (i) receives a second set of job steps from the user; (ii) assigns at least a subset of the set of product features to the second set of job steps; and (iii) assigns second respective effort scores to the second set of job steps.

The system obtains (806) a set of product features for a product designed to assist with completion of the job to be performed. For example, at least a portion of the product features are obtained from a user via the user interface 600-1 and/or the user interface 700. In some embodiments, the system analyzes the set of product features to identify one or more beneficiaries (e.g., by inputting the set of product features into a language model).

The system assigns (808) each product feature of the set of product features to a corresponding job step of the set of job steps. For example, the system uses a classification model and/or a language model to map the set of product features to the corresponding job steps. In some embodiments, at least a portion of the mapping is based on input received from the user (e.g., the user edits or supplements an initial mapping obtained from a model, or a model supplements an initial mapping obtained from the user).

The system assigns (810) respective effort scores to the set of job steps. For example, a customer effort score is assigned to each job step as illustrated in FIG. 7C. In some embodiments, the system obtains identification of a type of person (e.g., a customer segment) to perform the job to be performed, where the respective effort scores correspond to the type of person. In some embodiments, the system (i) obtains a second set of effort scores corresponding to a second type of person to perform the job to be performed; (ii) assigns the second set of effort scores to the set of job steps; and (iii)

causes the set of job steps to be presented to the user with the respective effort scores and the second set of effort scores. In some embodiments, the respective effort scores are determined based on an analysis of a set of customer support tickets, wherein respective support tickets in the set of customer support tickets are assigned to corresponding job steps of the set of job steps. In some embodiments, the system identifies a size of the customer segment and prioritizes the customer segment based on the identified size (e.g., weights the respective effort scores for the customer segment based on the size of the customer segment).

The system assigns (812) respective measures of importance to the set of product features based on the respective effort scores. For example, each feature is assigned a priority and/or ranking. In some embodiments, the system (i) obtains respective value data for the set of product features; and (ii) causes the set of product features to be presented to the user with the respective value data. For example, each feature is assigned a cost value, a revenue value, and/or an ROI value (e.g., as illustrated in FIG. 7A). In some embodiments, the set of product features are presented in a ranked ordered in accordance with the respective value data. In some embodiments, the system determines ROI data for the product based on the respective value data, and the set of product features are presented with the ROI data.

The system causes (814) the set of product features to be presented to the user with the respective measures of importance. For example, the user interface 600-1 in FIG. 6A or the user interface 700 in FIG. 7A is presented to the user. In some embodiments, the set of product features are presented as part of a product roadmap. In some embodiments, a model (e.g., a language model) generates the product roadmap based on the set of product features and the respective measures of importance. In some embodiments, the product roadmap is based on the respective measures of importance. In some embodiments, the system performs a roadmap analysis (e.g., using one or more language models and/or statistical models) to determine customer value for the product roadmap. In some embodiments, the system provides a ranking (e.g., a prioritization) of the set of product features based on the respective measures of importance. In some embodiments, the system identifies growth strategy steps based on the set of product features and the respective measures of importance. In some embodiments, the system causes display of the growth strategy steps and corresponding product features (e.g., ranked/prioritized to improve/maximize growth).

In some embodiments, the system causes the set of job steps to be presented to the user with the respective effort scores. For example, the user interface 740 in FIG. 7C is presented to the user. In some embodiments, the set of job steps are presented in an order of completion for the job to be performed. In some embodiments, the set of job steps are presented in an order based on corresponding customer effort scores.

In some embodiments, the system obtains a set of unmet needs that correspond to the set of job steps (e.g., as discussed above with respect to FIG. 7B), and the respective measures of importance are based on the set of unmet needs. In some embodiments, the set of unmet needs are obtained from a second language model in response to inputting the set of job steps and second instructions to the second language model. In some embodiments, the set of job steps are input into the second language model as a data array. In some embodiments, the system provides a set of example needs to the second language model.

For example, in some systems and processes identifying customer needs manually happens in parallel with creating the job steps. As explained previously, this process can take months to complete. Similar to job steps, integrating AI into the customer need process can significantly reduce time spent workshopping and researching (e.g., several seconds or minutes instead of several weeks or months) and improve accuracy/completeness. For example, using AI to populate a list of needs can be done in a fraction of the time it would take for needs to be identified manually with a similar accuracy rate. As an example, for the need creation, the input may be the job steps for a specific job, and a list of example job steps and their associated needs.

In some embodiments, the job steps are passed to the AI along with example steps and needs, which are gathered from a database and written into the prompt for the AI. In some embodiments, the job steps are input as an array, and the examples are input as a bulleted list. In some embodiments, the job steps are extracted from a prior language model (e.g., GPT) response and converted into an array that the customer needs model can digest. In some embodiments, the generated needs populate the "needs" section of each job step with an indication that the data came from AI. For example, when a user approves and/or edits the data, it is indicated in the user interface. The approved needs may become the reference points for the organization of customer insights, strategy decisions, current product analysis, and roadmap analysis, e.g., all conducted in the user interfaces described previously. In some embodiments, the system receives a lead (e.g., from the user or via a data gathering mechanism 14). In some embodiments, the system inputs the lead into a language model to identify one or more unmet needs that correspond to the lead.

In some embodiments, the system analyzes product development (e.g., released product features) to determine the customer value of the product development effort. For example, the system tracks whether completed product development aligns with the product strategy and determines whether the delivered customer value matches (or exceeds) anticipated customer value. In some embodiments, the system uses one or more models to analyze the product development (e.g., a statistical model 32). In some embodiments, the system analyzes the product development to update a roadmap for the product (e.g., re-prioritize product feature development). In some embodiments, the system analyzes the produce development to determine a cost/spend for each product feature (or job step or customer need). In some embodiments, the system analyzes product development and determines which developed features/code correspond to which job steps. In some embodiments, the product development analysis includes identifying which developed product features correspond to which job steps. In some embodiments, the system determines a development focus based on the analysis (e.g., reassigning resources for higher ranked features determined by the analysis).

In some embodiments, the system performs a current product analysis (e.g., to determine the customer value of the current product). In some embodiments, the system performs the current product analysis for a product of an organization and/or one or more competitor products. In some embodiments, the current product analysis includes determining which customer needs the current product addresses (and optionally how well it meets those needs). In some embodiments, the current product analysis includes mapping product features and/or code segments to customer needs. In some embodiments, the current product analysis is stored as a baseline for future product analysis (e.g., for roadmapping and/or development analysis).

In some embodiments, the system receives a marketing message from a user. For example, the user generates the marketing message by synthesizing the customer needs, the analysis of their solution, and the analysis of competitor products (e.g., using the user interfaces described herein). This synthesis and writing exercise may be a manual exercise. By passing this data set to a large language model, the system can automatically populate the messaging field. This is faster for users and in some cases produces more impactful messages (e.g., that the user can then edit before using the messaging in marketing campaigns). In some embodiments, the inputs to the language model include a description of the product, current competitor solutions (if any), a job step, a corresponding need, and/or an identified customer. In some embodiments, a set of guidelines (that the model must follow) are input into the language model. For example, the guidelines include the formatting requirements for each specific message type. In some embodiments, these inputs (with the exception of the guidelines) are extracted from the information provided by a user (e.g., into the user interfaces described herein). The guidelines for the model may be written into a prompt that is passed to the model. In some embodiments, the output of the model is a custom generated marketing message for any particular advertising platform specified by the user. The model output may contain all of the necessary outputs to fully create a campaign, such as keywords and/or titles for the advertisement. In some embodiments, the output of the model is used to populate a "messages" field within a user interface of the system. The user is then able to create an ad campaign using the generated content. In some embodiments, the user provides an initial marketing message, and the initial marketing message is input into a language model. In some embodiments, the language model provides edits and/or suggestions for the initial marketing message (e.g., based on a description of the product, current competitor solutions, a job step, a corresponding need, and/or an identified customer).

To identify a strategy for reducing customer churn, users may interview current customers, identify their complaints, write notes (e.g., next to job steps), and synthesize the notes into struggles to prioritize fixing. Meanwhile, customer support tickets represent an un-tapped resource for identifying customer struggles. In some embodiments, the system integrates with one or more customer support systems to ingest customer support tickets. In some embodiments, an AI (e.g., a language model) classifies each of these tickets to its most relevant job step, and then provides an overall customer sentiment analysis of each job step along with a summary of the cause of the sentiment. This allows users to have a much better understanding on which aspects of their business they need to focus on to reduce churn and increase sales.

Some embodiments use large language models (LLMs) to gather a comprehensive customer sentiment about individual job steps from various documents, e.g., from support tickets, sales transcripts, call transcripts, and/or notes. In some embodiments, the corpus of documents exceeds ten thousand, a million, a hundred million, or a billion. The process may include two classification steps, and then one step to deduct customer sentiment for each job step. For example, the system may complete a macro-level classification of hundreds to thousands of customer support tickets by job. In some embodiments, the system filters out any support ticket (or other document) that isn't relevant to a job step. Once the tickets have been assigned to the appropriate job, the next step may be to complete a micro-level classification of these tickets to a specific job step. Then, for each job step, the system may analyze all of the assigned support tickets and construct an overall customer sentiment. In some embodiments, the system performs a sentiment analysis on the customer support tickets (e.g., using a language model). In some embodiments, the sentiment analysis is used to determine an effort score for each corresponding job step. Determining effort scores from sentiment analysis of customer documents can avoid question bias (e.g., bias based on how a question is phrased or formatted). In some embodiments, the system performs a similar process (e.g., using LLMs) to categorize and perform sentiment analysis on social media posts (and/or other types of text or audio data related to a job).

In some embodiments, a customer sentiment report is produced based on real user information for each job step. In some embodiments, customer support tickets and a set of user jobs and job steps are input into a language model to produce the comprehensive customer sentiment report. In some embodiments, support tickets are pulled from an external customer support platform. In some embodiments, the job identifier (and optionally corresponding steps) is received from a user. For example, the job identifier and/or job steps are converted to json arrays and input into the language model. In some embodiments, the outputs of the language model are displayed on a user interface (e.g., the strategy user interface 740), e.g., to inform users of the job steps to mark as high priority in their strategy to reduce customer churn and increase sales to existing customers.

In some embodiments, the system analyzes (e.g., using a language model) sales data (e.g., sales transcripts, call transcripts, and/or notes) along with job steps and/or customer needs. In some embodiments, the system ranks sales tactics and/or recommends sales tactics based on the analysis.

Although FIGS. 4 and 8 illustrate a number of logical stages in a particular order, stages which are not order dependent may be reordered and other stages may be combined or broken out. Some reordering or other groupings not specifically mentioned will be apparent to those of ordinary skill in the art, so the ordering and groupings presented herein are not exhaustive. Moreover, it should be recognized that various stages could be implemented in hardware, firmware, software, or any combination thereof.

It will also be understood that, although the terms first, second, etc. may be used herein to describe various elements, these elements should not be limited by these terms. These terms are only used to distinguish one element from another. For instance, a first client device could be termed a second client device, and, similarly, a second client device could be termed a first client device, without departing from the scope of the present disclosure. The first client device and the second client device are both client devices, but they are not the same client device.

The terminology used in the present disclosure is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The foregoing description included example systems, methods, techniques, instruction sequences, and computing machine program products that embody illustrative implementations. For purposes of explanation, numerous specific details are set forth in order to provide an understanding of various implementations of the inventive subject matter. It will be evident, however, to those skilled in the art that implementations of the inventive subject matter may be practiced without these specific details. In general, well-known instruction instances, protocols, structures and techniques have not been shown in detail.

The foregoing description, for purpose of explanation, has been described with reference to specific implementations. However, the illustrative discussions below are not intended to be exhaustive or to limit the implementations to the precise forms disclosed. Many modifications and variations are possible in view of the above teachings. The implementations are chosen and described in order to best explain the principles and their practical applications, to thereby enable others skilled in the art to best utilize the implementations and various implementations with various modifications as are suited to the particular use contemplated.

In the interest of clarity, not all of the routine features of the implementations described herein are shown and described. It will be appreciated that, in the development of any such actual implementation, numerous implementation-specific decisions are made in order to achieve the designer's specific goals, such as compliance with use case- and business-related constraints, and that these specific goals will vary from one implementation to another and from one designer to another. Moreover, it will be appreciated that such a design effort might be complex and time-consuming, but nevertheless be a routine undertaking of engineering for those of ordering skill in the art having the benefit of the present disclosure.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Furthermore, when a reference number is given an "$i^{th}$" denotation, the reference number refers to a generic component, set, or embodiment. For instance, an application termed "application i" refers to the $i^{th}$ application in a plurality of applications.

In the present disclosure, unless expressly stated otherwise, descriptions of devices and systems will include implementations of one or more computers. For instance, and for purposes of illustration in FIG. 1, a client device 300 is represented as single device that includes all the functionality of the client device 300. However, the present disclosure is not limited thereto. For instance, the functionality of the client device 300 may be spread across any number of networked computers and/or reside on each of several networked computers and/or by hosted on one or more virtual machines and/or containers at a remote location accessible across a communications network (e.g., communications network 106). One of skill in the art will appreciate that a wide array of different computer topologies is possible for the client device 300, and other devices and systems of the preset disclosure, and that all such topologies are within the scope of the present disclosure.

All references cited herein are incorporated herein by reference in their entirety and for all purposes to the same extent as if each individual publication or patent or patent application was specifically and individually indicated to be incorporated by reference in its entirety for all purposes.

The present invention can be implemented as a computer program product that includes a computer program mechanism embedded in a non-transitory computer readable storage medium. For instance, the computer program product could contain the program modules shown in any combination of FIG. 1, 2A, 2B or 3. These program modules can be stored on a CD-ROM, DVD, magnetic disk storage product, or any other non-transitory computer readable data or program storage product.

Many modifications and variations of this invention can be made without departing from its spirit and scope, as will be apparent to those skilled in the art. The specific embodiments described herein are offered by way of example only. The embodiments were chosen and described in order to best explain the principles of the invention and its practical applications, to thereby enable others skilled in the art to best utilize the invention and various embodiments with various modifications as are suited to the particular use contemplated. The invention is to be limited only by the terms of the appended claims, along with the full scope of equivalents to which such claims are entitled.

What is claimed is:

1. A method of visualizing job segmentation, the method comprising:

for each respective user in a plurality of users, wherein the plurality of users comprises more than two users:

receiving, in electronic form, via a selection of a first graphical user interface element from a respective user, in a plurality of users, an identification of a first job, wherein the first job is defined by the respective user and to be performed by a user, in the plurality of users, different from the respective user;

generating a plurality of job steps corresponding to the first job, wherein each respective job step in the plurality of job steps is associated with a corresponding segmentation, in a plurality of segmentations, of the first job, each corresponding segmentation associated with a discrete contribution to deem completion of the first job;

generating a plurality of product features for a first product designed to assist the user, in the plurality of users, with completion of the first job, wherein each respective product feature in the plurality of product features is associated with a corresponding function, in a plurality of functions, provided by the first product;

assigning each respective product feature of the plurality of product features to a corresponding job step of the plurality of job steps;

generating a respective effort score for each job step in the plurality of job steps based, at least in part, on (i) a corresponding classification, in a plurality of classifications, assigned to the user and (ii) a feedback dataset associated with a second job performed by a set of users, in the plurality of users, different from the user and the respective user by performing a process comprising:

forming a taxonomy of data by converting, via at least one classification model in a plurality of classification models, the feedback dataset from a native format into a predetermined structured format, the converting comprising:
  converting a first data element of the feedback dataset from the native format of an audio data format into a predetermined structured format of a text file format, and
  converting a second data element of the feedback dataset from the native format of a plain text format into the predetermined structured format that defines each variable of a polynomial equation and deconstructs the polynomial equation into a plurality of unit operations, and the taxonomy of data comprises the plurality of classifications determined by the plurality of classification models and is uniquely formed for the first job
  assigning a corresponding plurality of measures of importance to each respective product feature in the plurality of product features based on the respective effort score, wherein the corresponding plurality of measures of importance comprises at least one cost value and at least one temporal value associated with producing the first product; and
  causing the plurality of product features to be presented to the respective user with the corresponding plurality of measures of importance in accordance with a ranked order of the corresponding plurality of measures of importance.

2. The method of claim 1, wherein the generating the plurality of job steps corresponding to segmentation of the first job to be performed comprises:
  providing the identification of the first job to be performed and one or more instructions to a language model; and
  in response to providing the identification of the first job to be performed, receiving the plurality of job steps from the language model.

3. The method of claim 2, wherein the one or more instructions is provided to the language model in a markdown table.

4. The method of claim 2, wherein the method further comprises providing a plurality of predetermined job steps to the language model.

5. The method of claim 4, wherein the plurality of predetermined of example job steps is provided in as a structured data array.

6. The method of claim 1, wherein the method further comprises causing the plurality of job steps to be presented to the respective user with the respective effort score.

7. The method of claim 6, wherein the plurality of job steps is presented in an order of completion for the first job to be performed.

8. The method of claim 1, wherein the method further comprises obtaining the corresponding classification of a type of person to perform the first job to be performed.

9. The method of claim 1, wherein the method further comprises obtaining a second plurality of effort scores corresponding to a second classification in the plurality of classifications;
  assigning the second plurality of effort scores to the plurality of job steps; and
  causing the plurality of job steps to be presented to the respective user with the respective effort score and the second plurality of effort scores.

10. The method of claim 1, wherein the at least one cost value comprises a return on investment (ROI) value for the first product.

11. The method of claim 1, wherein the method further comprises obtaining a plurality of unmet needs for the plurality of users that correspond to the plurality of job steps, wherein the corresponding plurality of measures of importance is based on the plurality of unmet needs.

12. The method of claim 11, wherein the plurality of unmet needs are obtained from a second language model in response to inputting the plurality of job steps and second instructions to the second language model.

13. The method of claim 12, wherein the plurality of job steps are input into the second language model as a data array.

14. The method of claim 12, further comprising providing a plurality of example needs to the second language model.

15. The method of claim 1, wherein the method further comprises receiving a second plurality of job steps from the respective user;
  assigning at least a subset of the plurality of product features to the second plurality of job steps; and
  generating a second respective effort score for each job step in the second plurality of job steps.

16. The method of claim 1, wherein the generating the plurality of job steps, the generating the plurality of product features, the assigning each respective product feature, the generating the respective effort score, the assigning the corresponding plurality of measures, and the causing the set of product features is performed without human intervention.

17. A computing system comprising at least one processor and a memory storing a set of instructions for execution by the at least one processor, the set of instructions comprising instructions for:
  for each respective user in a plurality of users, wherein the plurality of users comprises more than two users:
  receiving, in electronic form, via a selection of a first graphical user interface element from a respective user, in a plurality of users, an identification of a first job, wherein the first job is defined by the respective user and to be performed by a user, in the plurality of users, different from the respective user;
  generating a plurality of job steps corresponding to the first job, wherein each respective job step in the plurality of job steps is associated with a corresponding segmentation, in a plurality of segmentations, of the first job, each corresponding segmentation associated with a discrete contribution to deem completion of the first job;
  generating a plurality of product features for a first product designed to assist the user, in the plurality of users, with completion of the first job, wherein each respective product feature in the plurality of product features is associated with a corresponding function, in a plurality of functions, provided by the first product;
  assigning each respective product feature of the plurality of product features to a corresponding job step of the plurality of job steps;
  generating a respective effort score for each job step in the plurality of job steps based, at least in part, on (i) a corresponding classification, in a plurality of classifications, assigned to the user and (ii) a feedback dataset associated with a second job performed by a set of users, in the plurality of users, different from the user and the respective user by performing a process comprising:
  forming a taxonomy of data by converting, via at least one classification model in a plurality of classification models, the feedback dataset from a native format into a predetermined structured format, the converting comprising:

converting a first data element of the feedback dataset from the native format of an audio data format into a predetermined structured format of a text file format, and converting a second data element of the feedback dataset from the native format of a plain text format into the predetermined structured format that defines each variable of a polynomial equation and deconstructs the polynomial equation into a plurality of unit operations, and the taxonomy of data comprises the plurality of classifications determined by the plurality of classification models and is uniquely formed for the first job assigning a corresponding plurality of measures of importance to each respective product feature in the plurality of product features based on the respective effort score, wherein the corresponding plurality of measures of importance comprises at least one cost value and at least one temporal value associated with producing the first product; and causing the plurality of product features to be presented to the respective user with the corresponding plurality of measures of importance in accordance with a ranked order of the corresponding plurality of measures of importance.

18. A non-transitory computer-readable storage medium storing one or more programs, the one or more programs comprising instructions, which when executed by a computing system, cause the computing system to perform a method comprising:

for each respective user in a plurality of users, wherein the plurality of users comprises more than two users:

receiving, in electronic form, via a selection of a first graphical user interface element from a respective user, in a plurality of users, an identification of a first job, wherein the first job is defined by the respective user and to be performed by a user, in the plurality of users, different from the respective user;

generating a plurality of job steps corresponding to the first job, wherein each respective job step in the plurality of job steps is associated with a corresponding segmentation, in a plurality of segmentations, of the first job, each corresponding segmentation associated with a discrete contribution to deem completion of the first job;

generating a plurality of product features for a first product designed to assist the user, in the plurality of users, with completion of the first job, wherein each respective product feature in the plurality of product features is associated with a corresponding function, in a plurality of functions, provided by the first product;

assigning each respective product feature of the plurality of product features to a corresponding job step of the plurality of job steps;

generating a respective effort score for each job step in the plurality of job steps based, at least in part, on (i) a corresponding classification, in a plurality of classifications, assigned to the user and (ii) a feedback dataset associated with a second job performed by a set of users, in the plurality of users, different from the user and the respective user by performing a process comprising:

forming a taxonomy of data by converting, via at least one classification model in a plurality of classification models, the feedback dataset from a native format into a predetermined structured format, the converting comprising:

converting a first data element of the feedback dataset from the native format of an audio data format into a predetermined structured format of a text file format, and converting a second data element of the feedback dataset from the native format of a plain text format into the predetermined structured format that defines each variable of a polynomial equation and deconstructs the polynomial equation into a plurality of unit operations, and the taxonomy of data comprises the plurality of classifications determined by the plurality of classification models and is uniquely formed for the first job assigning a corresponding plurality of measures of importance to each respective product feature in the plurality of product features based on the respective effort score, wherein the corresponding plurality of measures of importance comprises at least one cost value and at least one temporal value associated with producing the first product; and causing the plurality of product features to be presented to the respective user with the corresponding plurality of measures of importance in accordance with a ranked order of the corresponding plurality of measures of importance.

* * * * *